(12) United States Patent  
Nagasawa

(10) Patent No.: US 9,712,707 B2  
(45) Date of Patent: Jul. 18, 2017

(54) INFORMATION PROCESSING APPARATUS AND USER DETECTION METHOD

(71) Applicant: Yuichi Nagasawa, Kanagawa (JP)

(72) Inventor: Yuichi Nagasawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/936,432

(22) Filed: Nov. 9, 2015

(65) Prior Publication Data

US 2016/0134773 A1   May 12, 2016

(30) Foreign Application Priority Data

Nov. 11, 2014   (JP) ................................ 2014-228765

(51) Int. Cl.
  *G06F 3/12*   (2006.01)
  *H04N 1/00*  (2006.01)
(52) U.S. Cl.
  CPC ..... *H04N 1/00896* (2013.01); *H04N 1/00915* (2013.01); *H04N 1/00933* (2013.01)
(58) Field of Classification Search
  None
  See application file for complete search history.

(56) References Cited

U.S. PATENT DOCUMENTS

| 8,768,196 | B2 |   | 7/2014 | Baba et al. |   |
|---|---|---|---|---|---|
| 9,088,682 | B2 | * | 7/2015 | Ono | H04N 1/00896 |
| 9,207,884 | B1 | * | 12/2015 | Baratharajan | G06F 3/1204 |
| 2010/0011439 | A1 | * | 1/2010 | Takiyama | G06F 21/34 |
|   |   |   |   |   | 726/19 |
| 2010/0231390 | A1 |   | 9/2010 | Hashimoto |   |
| 2013/0242067 | A1 | * | 9/2013 | Jeong | H04N 13/0402 |
|   |   |   |   |   | 348/54 |
| 2013/0321847 | A1 | * | 12/2013 | Eun | H04N 1/00891 |
|   |   |   |   |   | 358/1.14 |
| 2015/0185830 | A1 | * | 7/2015 | Iida | H04N 5/64 |
|   |   |   |   |   | 345/156 |

(Continued)

FOREIGN PATENT DOCUMENTS

| JP |   | 06094835 | A | * | 4/1994 |
| JP |   | H06-094835 |   |   | 4/1994 |

(Continued)

OTHER PUBLICATIONS

JP06094835—Namie et al.—English Translation (original JP submitted by Applicant).*

*Primary Examiner* — Miya J Williams  
(74) *Attorney, Agent, or Firm* — Harness, Dickey & Pierce, P.L.C.

(57) ABSTRACT

An information processing apparatus detects a first user and a second user that approaches the information processing apparatus by using a plurality of detection devices including a first detection device and a second detection device which is different from the first detection device. The information processing apparatus includes a second user determination unit configured to determine that a user detected by the first detection device is the second user, in a case where a certain time period has elapsed since the first detection device detects the user, at which the first user has been detected, the second detection device not detecting the user during the certain time period.

19 Claims, 21 Drawing Sheets

(56) References Cited

U.S. PATENT DOCUMENTS

| | | | |
|---|---|---|---|
| 2016/0142406 A1* | 5/2016 | Takeuchi | H04L 63/08 726/7 |
| 2016/0182756 A1* | 6/2016 | Akiyama | H04N 1/00896 358/1.13 |

FOREIGN PATENT DOCUMENTS

| | | |
|---|---|---|
| JP | 5278583 | 9/2013 |
| JP | 5424676 | 2/2014 |
| JP | 2014-059186 | 4/2014 |

* cited by examiner

INFORMATION PROCESSING APPARATUS AND USER DETECTION METHOD

CROSS-REFERENCE TO RELATED APPLICATIONS

The present application claims the benefit of priority under 35 U.S.C. §119 of Japanese Patent Application No. 2014-228765, filed Nov. 11, 2014. The contents of this application are incorporated herein by reference in their entirely.

BACKGROUND OF THE INVENTION

1. Field of the Invention

The disclosures herein generally relate to an information processing apparatus, a user detection method and a computer program product.

2. Description of the Related Art

Image processing apparatuses are provided with an energy-saving mode in order to reduce standby power consumption. The image processing apparatuses stand by in the energy-saving mode while they are not used by users. There is known a technology which detects an approach of the user using a human body detection sensor in such an image processing apparatus to start returning from the energy-saving mode, and thereby reduces a wait time period from user's arrival at the image processing apparatus to become operational.

In order to detect the user's approach faster or to reduce an erroneous detection of the user's approach, a plurality of human body detection sensors may be installed on the image processing apparatus (for example, see Japanese Unexamined Patent Application Publication No. 2014-059186). Japanese Unexamined Patent Application Publication No. 2014-059186 discloses an image processing apparatus which forms different detection areas by a plurality of human body detection sensors and detects an approach of a user to the image processing apparatus.

SUMMARY OF THE INVENTION

It is a general object of at least one embodiment of the present invention to provide an information processing apparatus, a user detection method and a computer program product that substantially obviate one or more problems caused by the limitations and disadvantages of the related art.

According to one aspect of the present invention, an information processing apparatus detects a first user and a second user that approaches the information processing apparatus by using a plurality of detection devices including a first detection device and a second detection device which is different from the first detection device. The information processing apparatus includes a second user determination unit configured to determine that a user detected by the first detection device is the second user, in a case where a certain time period has elapsed since the first detection device detects the user, at which the first user has been detected, the second detection device not detecting the user during the certain time period.

According to another aspect of the present invention, a user detection method is performed for detecting a first user and a second user that approaches an information processing apparatus by using a plurality of detection devices including a first detection device and a second detection device, which is different from the first detection device. The user detection method includes determining by a second user determination unit that a user detected by the first detection device is the second user, in a case where a certain time period has elapsed since the first detection device detects the user, at which the first user has been detected, the second detection device not detecting the user during the certain time period.

According to yet another aspect of the present invention, a non-transitory computer program product is executed on an information processing apparatus to perform a method for detecting a first user and a second user that approaches the information processing apparatus by using a plurality of detection devices including a first detection device and a second detection device, which is different from the first detection device. The method includes determining by a second user determination unit that a user detected by the first detection device is the second user, in a case where a certain time period has elapsed since the first detection device detects the user, at which the first user has been detected, the second detection device not detecting the user during the certain time period.

BRIEF DESCRIPTION OF THE DRAWINGS

Other objects and further features of embodiments will become apparent from the following detailed description when read in conjunction with the accompanying drawings, in which.

DESCRIPTION OF THE PREFERRED EMBODIMENTS

In the following, embodiments of the present invention will be described with reference to the accompanying drawings.

First Embodiment

Outline of Detection of Second User

Figure 1A:
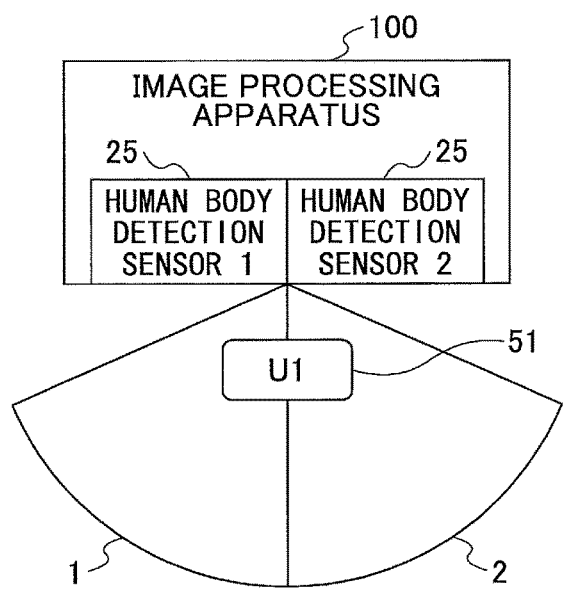
FIGS. 1A and 1B are diagrams for explaining an example of an outline of detection of a second user according to a first embodiment of the present invention.
Figure 1B:
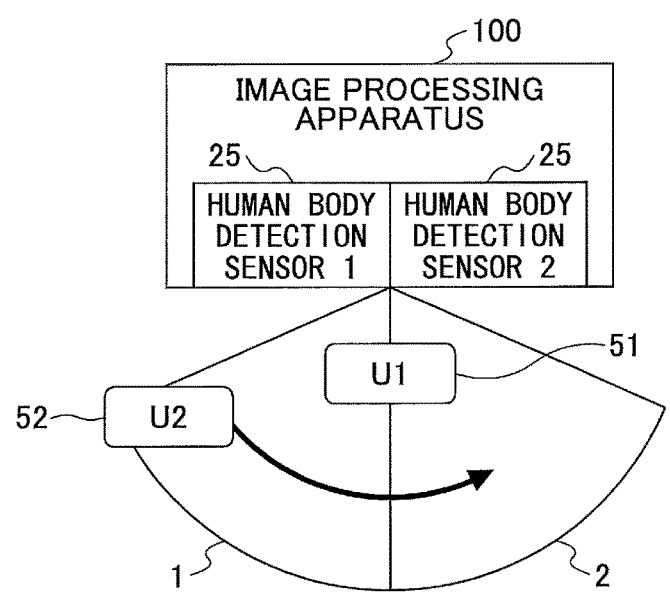

FIGS. 1A and 1B are diagrams for explaining an outline of detection of a second user.

An image processing apparatus 100 includes at least two human body detection sensors 25, which will be referred to as human body detection sensors 1 and 2 in order to distinguish them, forming detection areas 1 and 2, respectively.

FIG. 1A shows that a first user 51 uses the image forming apparatus 100 and exists in both the detection areas 1 and 2. Therefore, the two human body detection sensors are detecting (have detected) the first user 51.

Next, as shown in FIG. 1B, the second user 52 approaches the image processing apparatus 100. Since the second user 52 approaches the image processing apparatus 100 away from the first user 51, only the human body detection sensor 1 detects the second user 52. Under such state, the image processing apparatus 100 detects the approach of the second user 52 by using the following two methods.

(i) In a case where only the human body detection sensor 1 detects a user in a state that two human detection sensors 1 and 2 are detecting (have detected) the first user 51, it can be said that the there is a possibility that the user detected only by the human body detection sensor 1 is the first user 51 who has moved. Then, in a case where the human body detection sensor 2 does not detect a user within a certain period (motion determination time period, $T_0$, which will be described later) in which the first user 51 is determined to have moved, it is determined that the second user 52 is detected. Therefore, the sequence for detecting the second user 52 is as follows:

A. Two human body detection sensors are detecting (have detected) a user;

B. Only one human body detection sensor detects a user; and

C. A certain period or more has elapsed since the human body detection sensor of "B" detects the user without another human body detection sensor detecting a user.

Therefore, even if the two human body detection sensors 1 and 2 are not detecting a user, respectively, it is possible to detect the approach of the second user 52.

(ii) There is a case where the second user 52, after once entering the detection area 1, passes behind the first user 51 to move to the detection area 2. Since the second user 52 is detected by neither of the human body detection sensors while passing behind the first user 51, two or more human body detection sensors 1, 2 detect a user at intervals of a certain period or more.

Therefore, by assuming the following behavior of the second user 52, the approach of the second user 52 can be detected:

A. Two human body detection sensors are detecting (have detected) a user;

B. Only one human body detection sensor detects a user; and

C. A human body detection sensor, different from "B", detects the user at an interval of a certain period or more.

According to the above-described detection condition, it is possible to detect more definitely that the second user 52 approaches the image processing apparatus 100.

<About Terms Used in the Following>

The image processing apparatus 100 is provided with at least two operation modes, i.e. an energy-saving mode and a normal mode. The normal mode is an operation mode in which an operation of image processing is performed. The energy-saving mode is an operation mode of standing by in a state with power consumption less than the normal mode.

The energy-saving mode may include plural operation modes with power consumptions different from each other. The normal mode may include plural operation modes with power consumptions different from each other.

The user refers to a person who operates the image processing apparatus 100. However, the user may refer to a person who enters the detection areas 1, 2 irrelevant to whether to actually operate the image processing apparatus 100.

<Example of Configuration>

Figure 2:
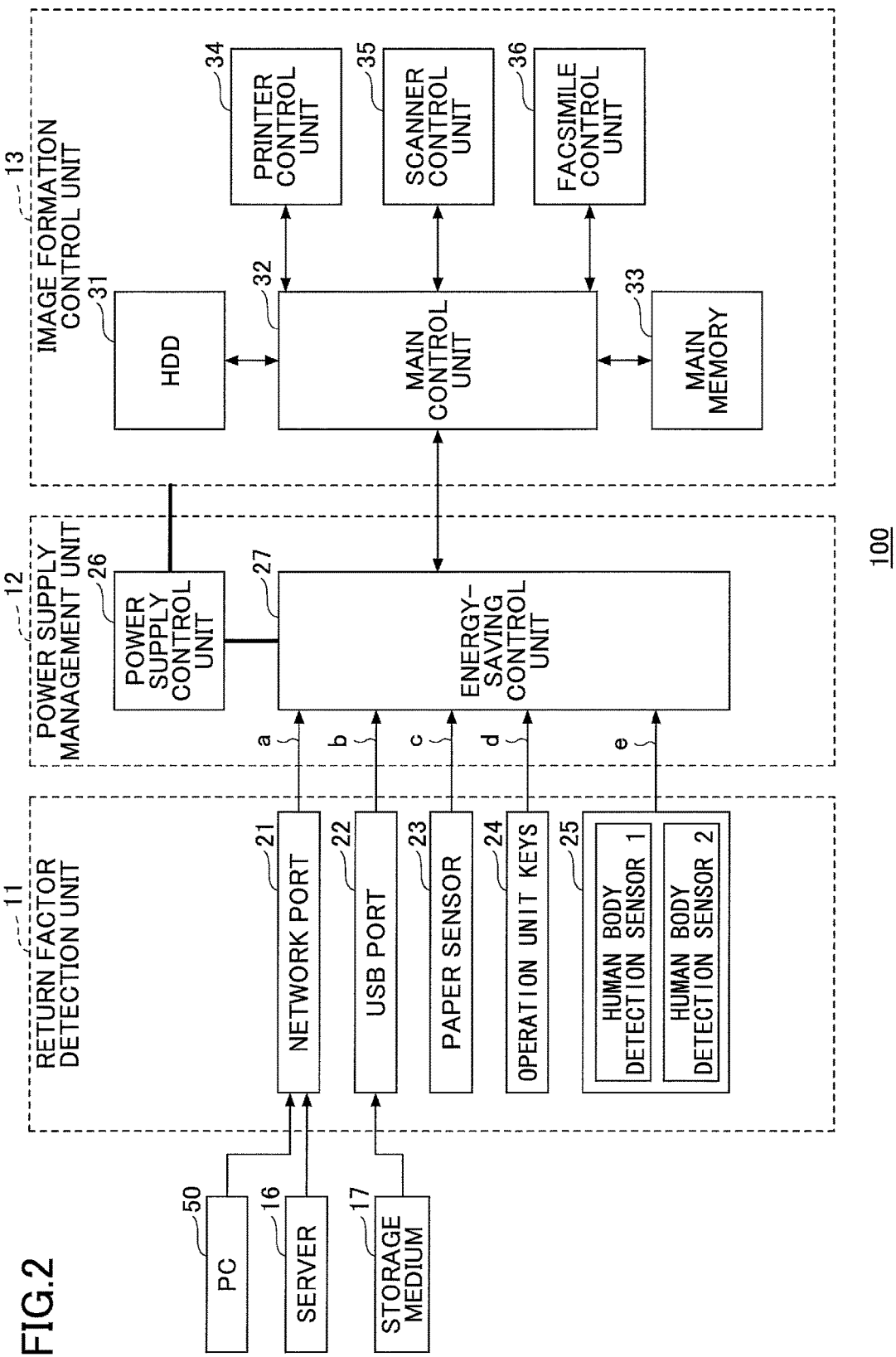
FIG. 2 is a configuration diagram illustrating an example of an image processing apparatus according to the first embodiment of the present invention.

FIG. 2 is a configuration diagram illustrating an example of an image processing apparatus 100 according to the present embodiment. The image processing apparatus 100 is, for example, a printer, a facsimile apparatus, a copier, a scanner, or a multifunctional peripheral provided with two or more functions thereof. Moreover, in the present embodiment, the image processing apparatus 100 is provided with operation modes of the energy-saving mode and the normal mode, which will be described later. The image processing apparatus 100 returns from the energy-saving mode to the normal mode by the human body detection sensor 25. However, the method for detecting the second user according to the present embodiment can be preferably applied also to an apparatus which is not provided with different operation modes. Even if the apparatus is not provided with the energy-saving mode (provided only with the normal mode), the apparatus has no problem detecting an approach of the second user 52.

The image processing apparatus 100 includes an image formation control unit 13 which operates mainly on image formation, a power supply management unit 12 which controls a power consumption state of the image processing apparatus 100, and a return factor detection unit 11 which detects a return factor.

The power supply management unit 12 includes a power supply control unit 26 coupled to an energy-saving control unit 27. Moreover, the return factor detection unit 11 includes a network port 21, a USB port 22, a paper sensor 23, operation unit keys 24 and a human body detection sensor 25, which are coupled to the energy-saving control unit 27, respectively. In the present embodiment, at least two human body detection sensors 25 are arranged, which will be referred to as human body detection sensors 1 and 2 in a case of distinguishing them.

Moreover, the image formation control unit 13 includes an HDD 31, a main memory 33, a printer control unit 34, a scanner control unit 35 and a facsimile control unit 36, which are connected to a main control unit 32. The main control unit 32 is coupled to the energy-saving control unit 27.

At first, the return factor detection unit 11 will be explained. The network port 21 is an input/output I/F (interface) for coupling the image processing apparatus 100 to a network such as a LAN (Local Area Network) or a WAN (Wide Area Network). For example, it is realized by a communication device such as an Ethernet card (trademark registered) or Bluetooth (trademark registered). To the network, a PC (Personal Computer) 50 which a user operates, a server 16 and other image processing apparatuses, which will be described later in the second embodiment or the like, are coupled. The network port 21 sends a return factor "a" to the energy-saving control unit 27 in a case of receiving a print job, for example.

The USB port 22 is an input/output I/F for coupling a device or a cable having an interface of USB (Universal Serial Bus) to the image processing apparatus 100. For example, to the USB port 22 a storage medium 17 is coupled. As the storage medium 17, for example, a USB memory including a flash memory as a memory element, or an HDD which is a non-volatile high-capacity storage medium is coupled. Moreover, to the USB port 22, an apparatus for playing an optical storage medium such as a CD-ROM may be coupled. For example, in a case of coupling the USB memory, the USB port 22 informs the energy-saving control unit 27 that a return factor "b" has been detected.

The paper sensor 23 detects a manuscript placed on a manuscript tray, for example. The paper sensor 23 is arranged, for example, at an installation site for a manuscript in an ADF (Auto Document Feeder) or a manual feed tray. Moreover, an open/close operation of the ADF or an open/close operation of a cover of a contact glass for scanning a manuscript may be detected. In a case of detecting a manuscript, the paper sensor 23 informs the energy-saving control unit 27 that a return factor "c" has been detected.

The operation unit keys 24 are various hard keys arranged on an operation panel and soft keys displayed on a touch panel integrated with the operation panel. The operation panel has a function as a display device to display various pieces of information. Hard keys include a copy button that causes the image processing apparatus 100 to operate as a copier, a printer button that causes the image processing apparatus 100 to operate as a printer, a scanner button that causes the image processing apparatus 100 to operate as a scanner, a facsimile button that causes the image processing apparatus 100 to operate as a facsimile apparatus, or the like. Moreover, hard keys include numeric keys for receiving an input of a numerical value, a start button for receiving execution of an operation or the like. Soft keys include a button for receiving an operation for setting a paper size, magnification, read density upon scanning, a resolution, a destination or the like. In a case of detecting an operation for the operation unit keys 24, the operation unit keys 24 notify the energy-saving control unit 27 that a return factor "d" is detected.

The human body detection sensor 25 detects a user who exists adjacent to the image processing apparatus 100 even if the user does not operate the image processing apparatus 100. The human body detection sensor 25 detects that the user approaches within a predetermined distance from outside the image processing apparatus 100 and separates from the range of the distance. The distance upon approaching and the distance upon separating may be the same or may be different from each other. Moreover, in a case where the human body detection sensor has a function of detecting a distance to the user, the user's approaching or separating may be detected by not only the distance but also a change of the distance.

The human body detection sensor 25 includes, for example, an infrared sensor, a sonic sensor, a temperature sensor, a radar, a camera, a sensor for detecting a change of electrostatic capacitance, or a combination thereof. Moreover, in a case where the user carries an IC card or a mobile terminal, a communication apparatus that communicates with a communication device included in the IC card or the mobile terminal (an IC card, WiFi, Bluetooth, Zigbee (trademark registered)) may be used as the human body detection sensor 25. Among them, by using the infrared sensor, the user can be detected inexpensively.

In a case of detecting the user approaching within a predetermined distance from the image processing apparatus, the human body sensor 25 notifies the energy-saving control unit 27 that a return factor "e" is detected. Meanwhile, a part of the return factor "e" is processed as a signal "sig", which will be described later.

Next, the power supply management unit 12 will be explained. The power supply control unit 26 turns ON or OFF electric power of the image formation control unit 13. In the present embodiment, depending on a state of the electric power of the image formation control unit 13, an operation mode of the image processing apparatus 100 will be referred to as follows:

A state where the electric power of the image formation control unit 13 is OFF: energy-saving mode; and A state where the electric power of the image formation control unit 13 is ON: Normal state.

During the energy-saving mode, electric power is supplied to the power supply management unit 12 and the return factor detection unit 11, which monitor whether a return factor occurs.

The energy-saving control unit 27 requires the power supply control unit 26 to turn ON/OFF the electric power of the image formation control unit 13, in a case of determining that a transition condition of an operation mode, which will be described later, is satisfied.

Next, the image formation control unit 13 will be explained. The HDD 31 stores an application program for performing a process of copying, printing, scanning, sending/receiving facsimile or the like, and data of an object to be printed received from a PC, font data or the like.

The main memory 33 is, for example, a fast and volatile memory (e.g. a DDR SDRAM (Double-Data-Rate Synchronous Dynamic Random Access Memory) or the like). The main memory 33 operates as a working memory for the main control unit 32 rendering print data or performing a gamma correction, a skew correction, a jaggy correction, trimming or the like.

The printer control unit 34 controls a print engine (e.g. a mechanism for executing an electrophotographic process or a mechanism for discharging ink droplets) or a paper feeding system to print print data on a paper. The scanner control unit 35 controls the print engine to convert a manuscript into image data. The facsimile control unit 36 sends the image data prepared by the scanner control unit 35 or raster data prepared by the main control unit 32 from the print data to a destination via a telephone line or a network.

The main control unit 32 performs overall control of the image formation. For example, in a case of receiving a print job from a PC, the main control unit 32 causes print data acquired via the energy-saving control unit 27 to be rendered and converted into raster data, and to be printed on a paper by the printer control unit 34. Moreover, in a case of receiving a scanner job by the operation unit keys 24, the main control unit 32 causes the scanner control unit 35 to read out a manuscript. In a case of receiving a facsimile job, the main control unit 32 causes the scanner control unit 35 to read out the manuscript and causes the facsimile control unit 36 to send the manuscript data.

Figure 3:
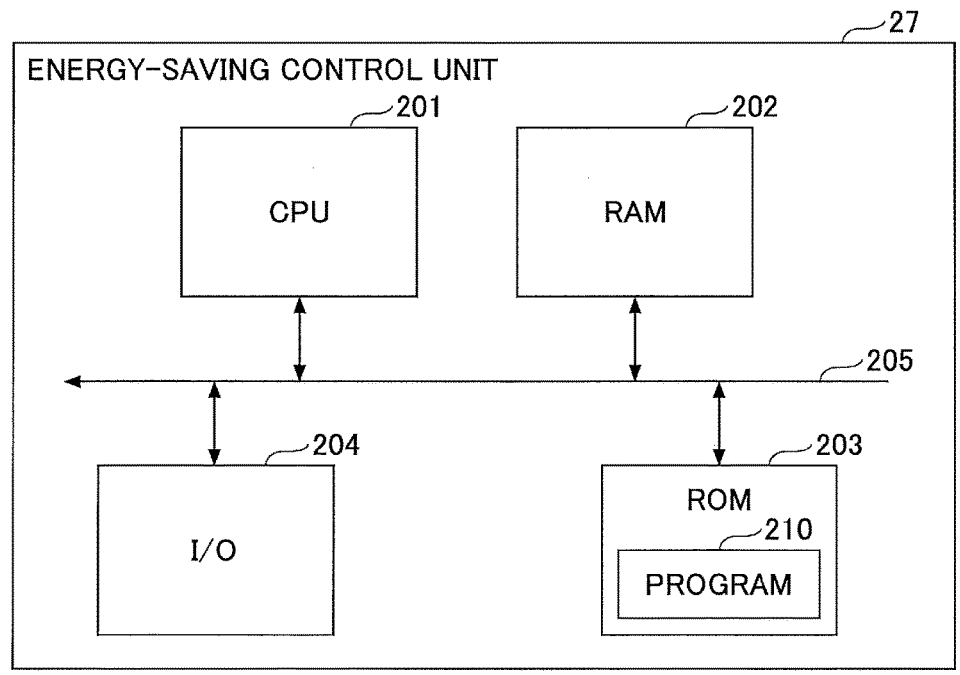
FIG. 3 is a hardware configuration diagram illustrating an example of an energy-saving control unit according to the first embodiment of the present invention.

FIG. 3 is a hardware configuration diagram illustrating an example of the energy-saving control unit 27. The energy-saving control unit 27 is provided to function as an information processing apparatus (computer), and is realized by the hardware configuration as shown in FIG. 3. The energy-saving control unit 27 includes a CPU 201, a RAM 202, a ROM 203 and an I/O 204, which are connected with each other via a bus 205.

Figure 4:
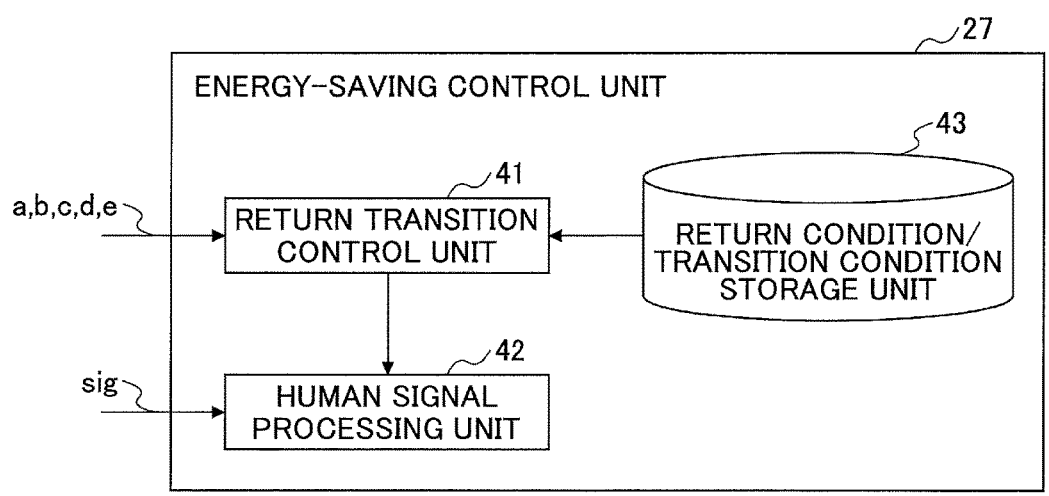
FIG. 4 is a functional block diagram illustrating an example of the energy-saving control unit according to the first embodiment of the present invention.

The CPU 201 executes a program 210 by using the RAM 202 as a work memory to perform overall control of the energy-saving control unit 27. The ROM 203 is a non-volatile memory, such as a flash memory, and stores the program 210. By the CPU 201 executing the program 210 a function, which will be described next with reference to FIG. 4, is provided. The I/O 204 is an interface for inputting/outputting. The return factor detection unit 11 and the image formation control unit 13 are coupled to the I/O 204.

Meanwhile, the program 210 is downloaded from the server 16 and installed in the energy-saving control unit 27, or distributed in a state of having been stored in a storage medium 17 and installed via the USB port 22.

<Function of Image Processing Apparatus>

A function in a case where the image processing apparatus 100 detects a second user 52 will be explained with reference to FIG. 4. FIG. 4 is a functional block diagram illustrating an example of the energy-saving control unit 27. A return transition control unit 41 and a human signal processing unit 42 of the energy-saving control unit 27 are functions or means realized by the CPU 201 executing the program 210 and cooperating with hardware such as the hardware shown in FIG. 3, the return factor detection unit 11 and the image formation control unit 13.

Moreover, the image processing apparatus 1 includes a return condition/transition condition storage unit 43. The return condition/transition condition storage unit 43 stores a return condition and a transition condition, and is built in the ROM 203 or the RAM 202.

The return transition control unit 41 monitors whether the return condition or the transition condition stored in the return condition/transition condition storage unit 43 is satisfied, and controls a transition from the normal mode to the energy-saving mode and a return from the energy-saving mode to the normal mode. In a case of transitioning to the energy-saving mode, the return transition control unit 41 requires the power supply control unit 26 to turn OFF the electric power, and in a case of transitioning to the normal mode, the return transition control unit 41 requires the power supply control unit 26 to turn ON the electric power.

The return condition is that the return factor detection unit 11 detects the return factors "a" to "e" and notifies the energy-saving control unit 27 of them. Moreover, the transition condition is, for example, that a predetermined time period has elapsed since the image processing apparatus 100 in the normal mode completes the operation. Therefore, the return transition control unit 41 monitors an operation of the main control unit 32, measures a time period from the completion of the operation and determines that the transition condition is satisfied when the predetermined time period has elapsed.

Moreover, as the transition condition, detection of the user's separating by the human body detection sensor 25 may be used. The transition condition of the return transition control unit 41 is just after the human body detection sensor 25 finishes detecting all users or that a predetermined time period has elapsed since the human body detection sensor 25 finishes detecting all users.

The human signal processing unit 42 monitors a signal "sig" output from the human body detection sensor 25 to distinguish the first user 51 who approaches the image processing apparatus 100 from the second user 52. Details of the above-described operation will be explained with reference to FIG. 5. The human signal processing unit 42 is an example of a second user determination means.

<Distinguishing First User from Second User>

First, a detection area will be explained. A detection area 1 that the human body detection sensor 1 forms and a detection area 2 that the human body detection sensor 2 forms are assumed to be formed as shown in FIGS. 1A and 1B. That is, the detection area 1 and the detection area 2 are formed adjacent to each other in a direction parallel to a front face of the image processing apparatus 100. Ideally, as shown in FIGS. 1A and 1B, the detection area 1 and the detection area 2 are formed without a gap or an overlap. However, between the detection area 1 and the detection area 2, there may be a small gap or there may be a small overlap. In a case where there is a gap, the gap has only to be a gap such that a user using the image processing apparatus 100 can be detected simultaneously by the human body detection sensor 1 and the human body detection sensor 2 (a gap less than a shoulder-width of the user, for example). Moreover, in a case where there is an overlap, a region which does not overlap is required to remain so that only in the detection area 1 and only in the detection area 2 the user can be detected (i.e. exclusively detecting the user). Meanwhile, sizes or the shapes of the detection area 1 and the detection area 2 may not be the same.

The signal "sig" that the human body detection sensor 1 and the human body detection sensor 2 detect in a case where the first user 51 moves in a state where the detection area 1 and the detection area 2 are formed, as shown in FIGS. 1A and 2B, will be explained.

Figure 5:
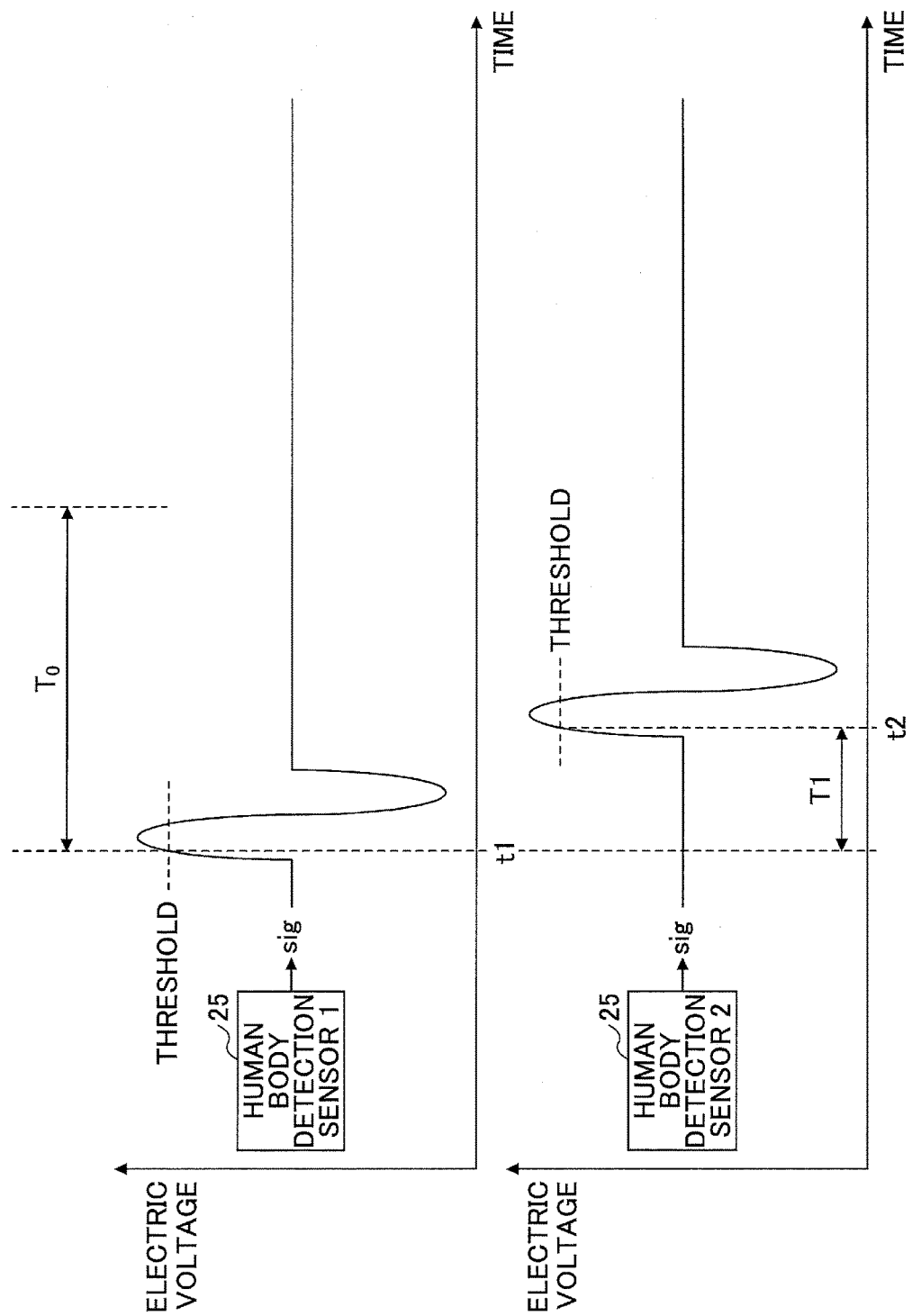
FIG. 5 is a diagram schematically illustrating a signal "sig" of a human body detection sensor in a case where a first user moves according to the first embodiment of the present invention.

FIG. 5 is a diagram schematically illustrating a signal "sig" of the human body detection sensor 1 and the human body detection sensor 2 in the case where the first user 51 moves. Assume that in a state where the first user 51 approaches (uses) the image processing apparatus 100 the first user 51 moves in a direction parallel to the front face of the image processing apparatus 100 (a direction for moving from the detection area 1 to the detection area 2 or from the detection area 2 to the detection area 1). In this case, the two human detection sensors 1 and 2 output signals "sig" which are greater than a threshold simultaneously or in a short time. In FIG. 5, at time t1, the signal "sig" from the human body detection sensor 1 exceeds the threshold, and thereafter the signal "sig" from the human body detection sensor 2 exceeds the threshold at time t2. That is, since the user exists adjacent to the image processing apparatus 100, both the human body detection sensors 1, 2 certainly detect the user simultaneously or in a short time period.

Elapsed time period T1 from the time t1 to the time t2 is shorter than predetermined "time period for determining that the first user 51 moves". That is, in a case where both the two human body detection sensors 1, 2 output the signals "sig" which are greater than the threshold within the above-described predetermined time period, it is determined that the first user 51 adjacent to the image processing apparatus 100 moves. In the following, "time period for determining that the first user 51 moves" will be referred to as "motion determination time period $T_0$".

Next, signals "sig" that the human body detection sensor 1 and the human body detection sensor 2 detect in a case where a second user 52 approaches the image processing apparatus 100 will be explained.

Figure 6:
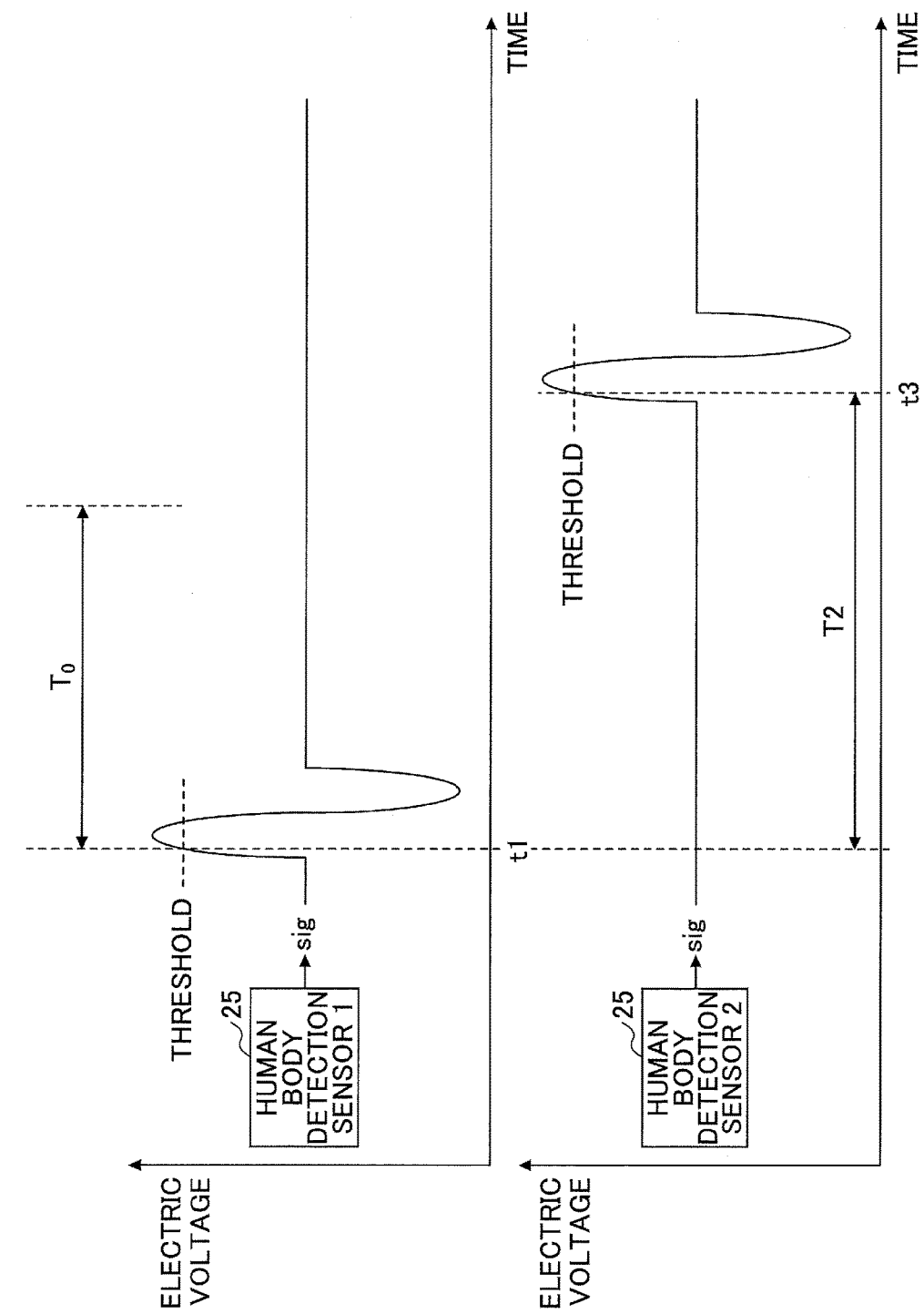
FIG. 6 is a diagram schematically illustrating the signal "sig" of the human body detection sensor in a case where the second user approaches the image processing apparatus according to the first embodiment of the present invention.

FIG. 6 is a diagram schematically illustrating an example of the signals "sig" of the human body detection sensors 1, 2 in the case where the second user 52 approaches the image processing apparatus. Assume that after the second user 52 goes into the detection area 1, the second user 52 goes into the detection area 2. In this case, it is considered that after the signal "sig" of the human body detection sensor 1 exceeds the threshold, and after a time period for getting to the detection area 2 from the detection area 1, the signal "sig" of the human body detection sensor 2 exceeds the threshold.

The time period for getting to the detection area 2 from the detection area 1 is longer than the motion determination time period $T_0$. Therefore, elapsing of the motion determination time period $T_0$ after the second user 52 goes into the detection area 1 does not indicate that the first user moves. By using the above-described processing, the human signal processing unit 42 can determine that the second user 52 approaches at a time when the time period measured from the time t1 becomes greater than the motion determination time period $T_0$ without the human body detection sensor 2 outputting the signal "sig" which is greater than the threshold. That is, even if the second user 52 does not move from the detection area 1 to the detection area 2, it is possible to detect that the second user 52 approaches.

Moreover, in FIG. 6, at time t1, the signal "sig" from the human body detection sensor 1 exceeds the threshold, and at time t3, the signal "sig" from the human body detection sensor 2 exceeds the threshold. Elapsed time period T2 from the time t1 to the time t3 is longer than the motion determination time period $T_0$. Therefore, the human signal processing unit 42 may determine that the second user 52 approaches in a case where after the time period measured from the time t1 becomes greater than the motion determination time period $T_0$, the signal "sig" from the human body detection sensor 2 exceeds the threshold. In this case, it is possible to detect that the second user 52 approaches more definitely.

<Operational Procedure>

Figure 7:
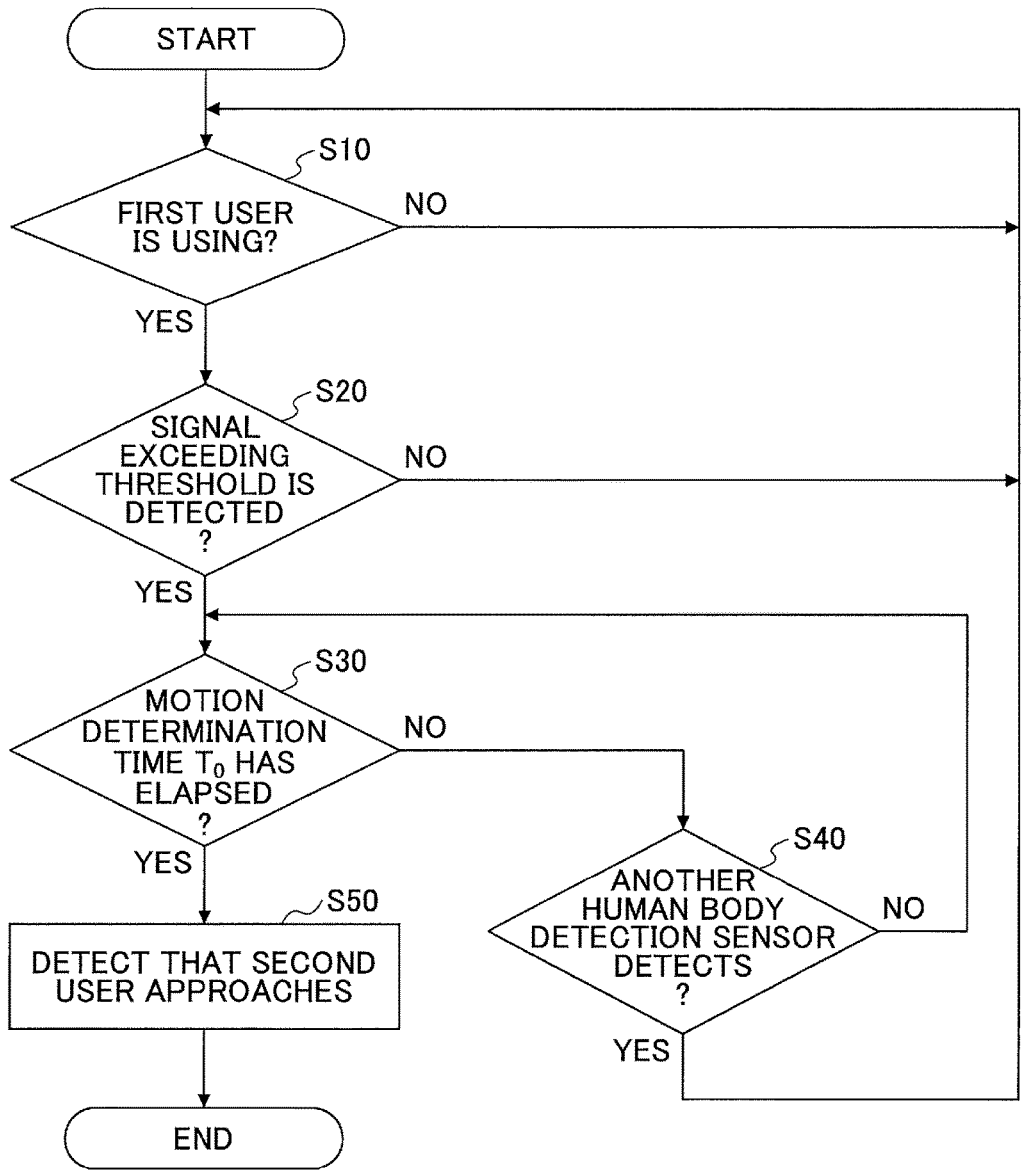
FIG. 7 is a flowchart illustrating an example of a procedure of a human signal processing unit for detecting the second user according to the first embodiment of the present invention.

FIG. 7 is a flowchart illustrating an example of a procedure of the human signal processing unit 42 for detecting the second user 52.

The human signal processing unit 42 determines whether the first user is using the image processing apparatus 100 (step S10). That is, as explained with reference to FIG. 5, the human signal processing unit 42 determines, within the motion determination time period $T_0$, whether the signal "sig", which the human body detection sensor 1 and the human body detection sensor 2 detect, exceeds the threshold.

In a case where a result of the determination of step S10 is "No", the image processing apparatus 100 is not used and the process returns to step S10.

In a case where the result of the determination of step S10 is "YES", the human signal processing unit 42 determines whether the signal "sig", which any of the human body detection sensor 1 and the human body detection sensor 2 outputs, exceeds the threshold (step S20).

In a case of not exceeding the threshold (step S20: NO), the process returns to step S10, and the determination whether the first user 51 continues the usage is continued.

In a case of exceeding the threshold (step S20: YES), because the first user 51 is possibly using the image processing apparatus 100 or the second user possibly approaches, the human signal processing unit 42 determines whether the motion determination time period $T_0$ has elapsed since the signal "sig" that the human body detection sensor 1 or the human body detection sensor 2 detects exceeds the threshold (step S30).

Before the motion determination time period $T_0$ has elapsed (step S30: NO), the human signal processing unit 42 determines whether the signal "sig" from a human body detection sensor 25, which is not the human body detection sensor 25 detecting the user at step S30 (other human body detection sensor 25), exceeds the threshold (step S40).

In a case where the signal "sig" from the other human body detection sensor 25 does not exceed the threshold (step S40: NO), the process returns to step S30, and it is determined whether the motion determination time period $T_0$ has elapsed.

In a case where the signal "sig" from the other human body detection sensor 25 exceeds the threshold (step S40: YES), since the first user 51 moves, it can be estimated that only one user exists, and the process returns to step S10.

In a case where at step S30 the motion determination time period $T_0$ has elapsed (step S30: YES), the human signal processing unit 42 determines that the second user approaches (step S50).

There is a problem for the conventional image processing apparatus that even in a case where while a user uses the image processing apparatus an approach of another user is detected, it is impossible to determine whether the other user is a first user or a second user.

According to the image processing apparatus 100 of the present embodiment, it is possible to determine whether each of the plurality of approaching users is the first user or the second user.

Figure 8:
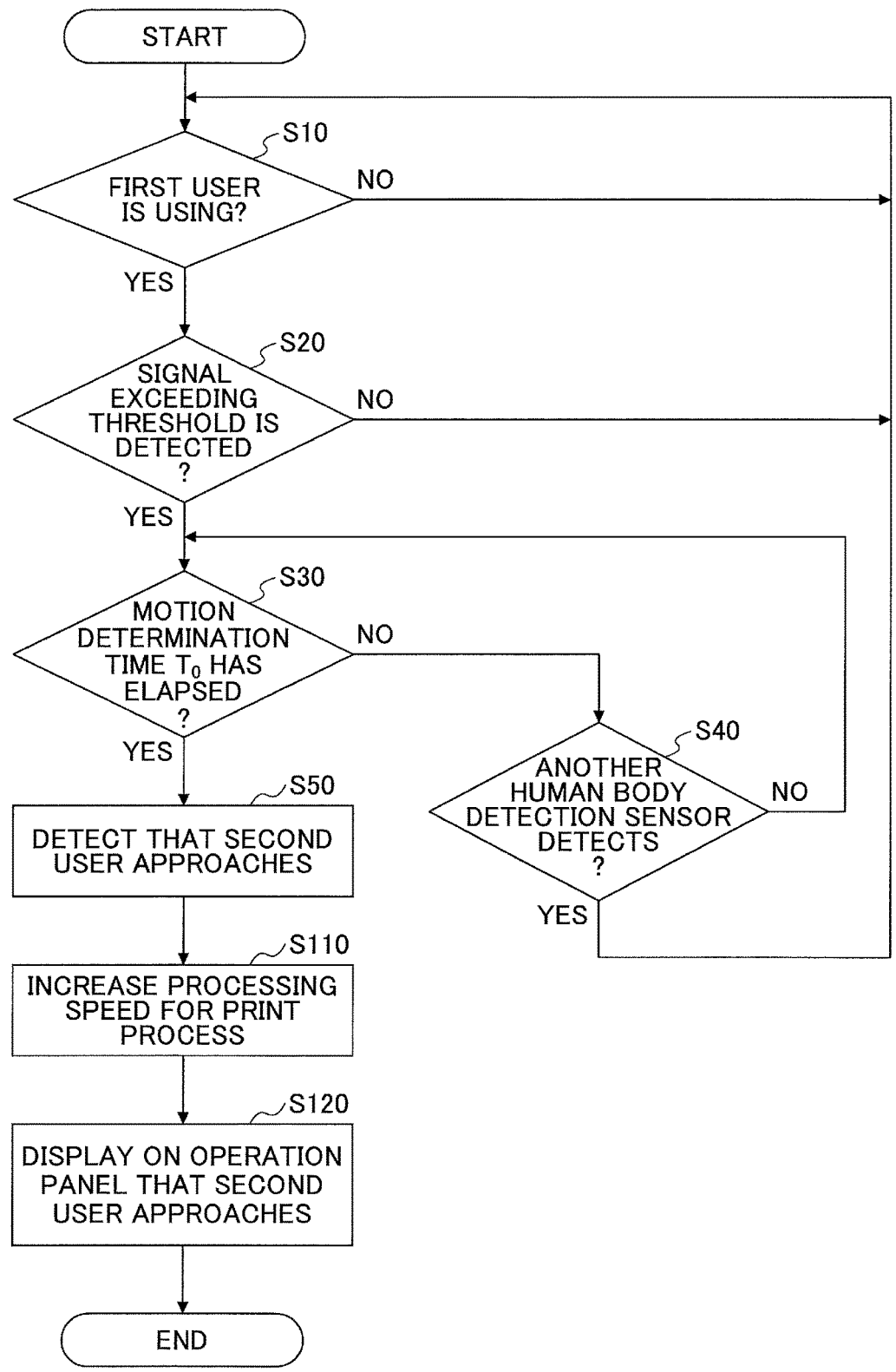
FIG. 8 is a flowchart illustrating an example of a procedure of the human signal processing unit for detecting the second user to perform a predetermined control according to the first embodiment of the present invention.

Meanwhile, as shown in FIG. 8, the image processing apparatus 100 may perform a predetermined control after it is determined that the second user 52 is detected. FIG. 8 is a flowchart illustrating an example of a procedure of the human signal processing unit 42 for detecting the second user to perform a predetermined control.

In FIG. 8, in a case where at step S50 the human signal processing unit 42 determines that the second user 52 is detected, the image processing apparatus 100 performs a control for increasing a processing speed for a print process or the like (step S110). For example, as the print process, rendering is speeded up, and an image process less affecting image quality is omitted. Then, usage of the image processing apparatus 100 by the first user 51 can be finished earlier, and the second user 52 can start using the image processing apparatus 100.

Moreover, the image processing apparatus 100 displays on the operation panel that the second user 52 approaches (step S120). Then, the first user 51 tries to release the image processing apparatus 100 earlier and the second user 52 can start using the image processing apparatus earlier. It becomes possible to gain the first user's attention in a situation where it is difficult to recognize a rear side such as not only the image processing apparatus 100, but also a ticket-vending machine or an ATM (Automatic Teller Machine).

Second Embodiment

In the present embodiment, an image processing apparatus 100 which returns from an energy-saving mode by using a configuration that a plurality of image processing apparatuses 100 are connected via a network will be explained.

Figure 9A:
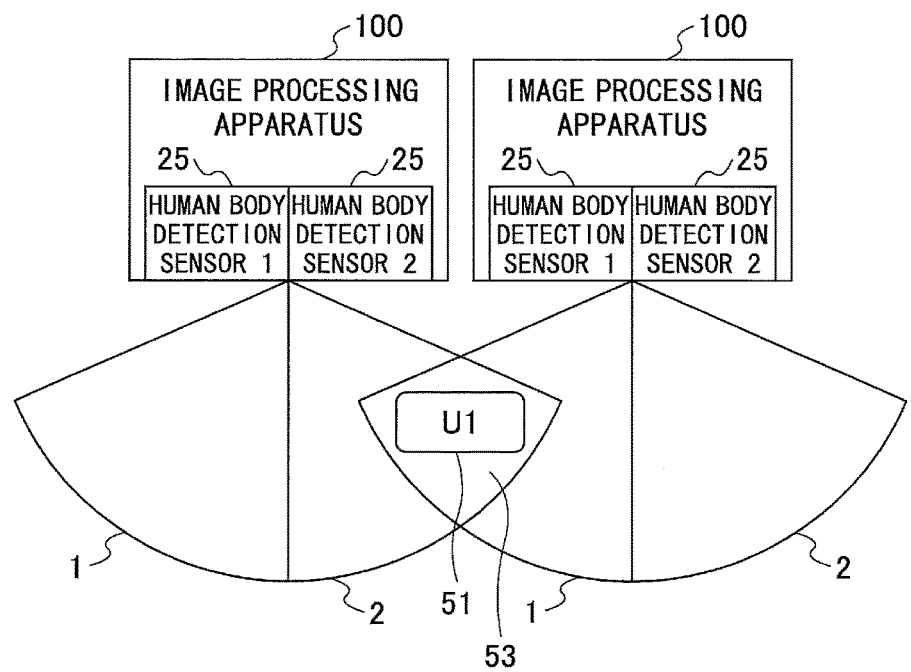
FIGS. 9A and 9B are diagrams schematically illustrating an example of a detection area according to the first embodiment of the present invention.
Figure 9B:
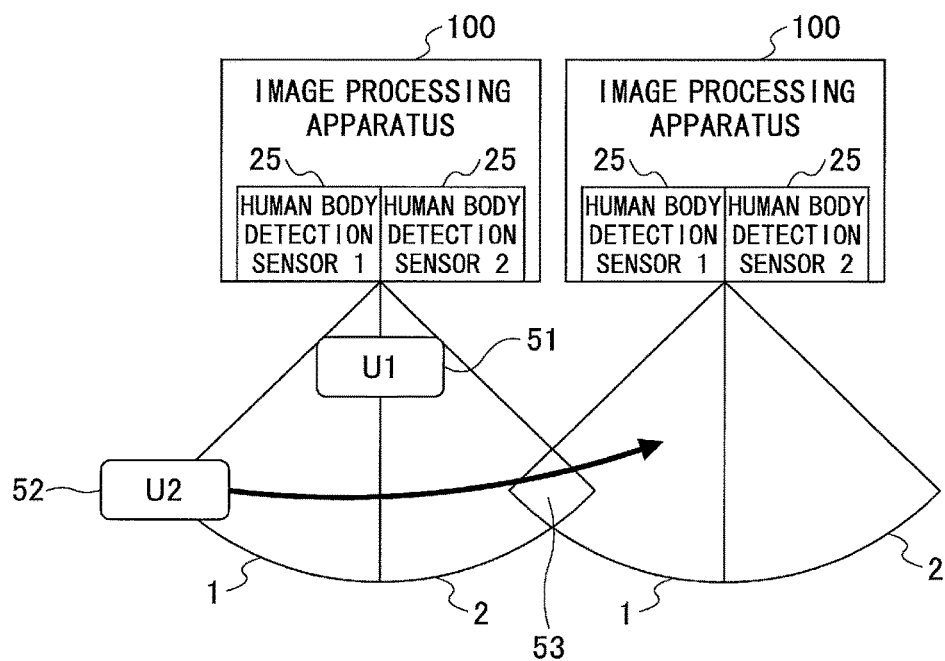

First, a situation to which the present embodiment can be applied will be explained with reference to FIGS. 9A and 9B. FIGS. 9A and 9B are diagrams schematically illustrating an example of a detection area. In FIG. 9A, detection areas 1, 2 of two image processing apparatuses 100 (in a case of distinguishing the two image processing apparatuses 100, they will be referred to as image processing apparatuses 1, 2) overlap with each other. In this case, when the first user 51 goes into the overlap region 53 of the detection area 1 and the detection area 2, both the image processing apparatuses 1, 2 return from the energy-saving mode, and electric energy goes to waste.

Therefore, as shown in FIG. 9B, reducing the overlap region 53 is considered by narrowing the detection areas 1, 2. For example, in a case where a seat of a staff member is arranged in the neighborhood and a detection area is set narrow so as not to return from the energy-saving mode wastefully by the staff member's seating and separating, it is possible to prevent both the image processing apparatuses 1, 2 from returning from the energy-saving mode by one user.

However, when the detection areas are narrowed, as shown in FIG. 9B, in a case where the second user 52 approaches the image processing apparatus 2, which is the second device, a timing for detecting the second user 52 by the human body detection sensor 25 of the image processing apparatus 2 is delayed and a wait time period for the user could become longer.

Then, in the present embodiment, in a case where the image processing apparatus 1 detects the second user 52, a return request shall be sent to the image processing apparatus 2. Since the image processing apparatus 2 can obtain a notice that the second user approaches before the second user 52 goes into the detection area 1 of the image processing apparatus 2, the image processing apparatus 2 can return from the energy-saving mode earlier. In this way, the present embodiment can be applied to the case where the detection areas 1, 2 of the human body detection sensors 1, 2 are narrow.

Figure 10:
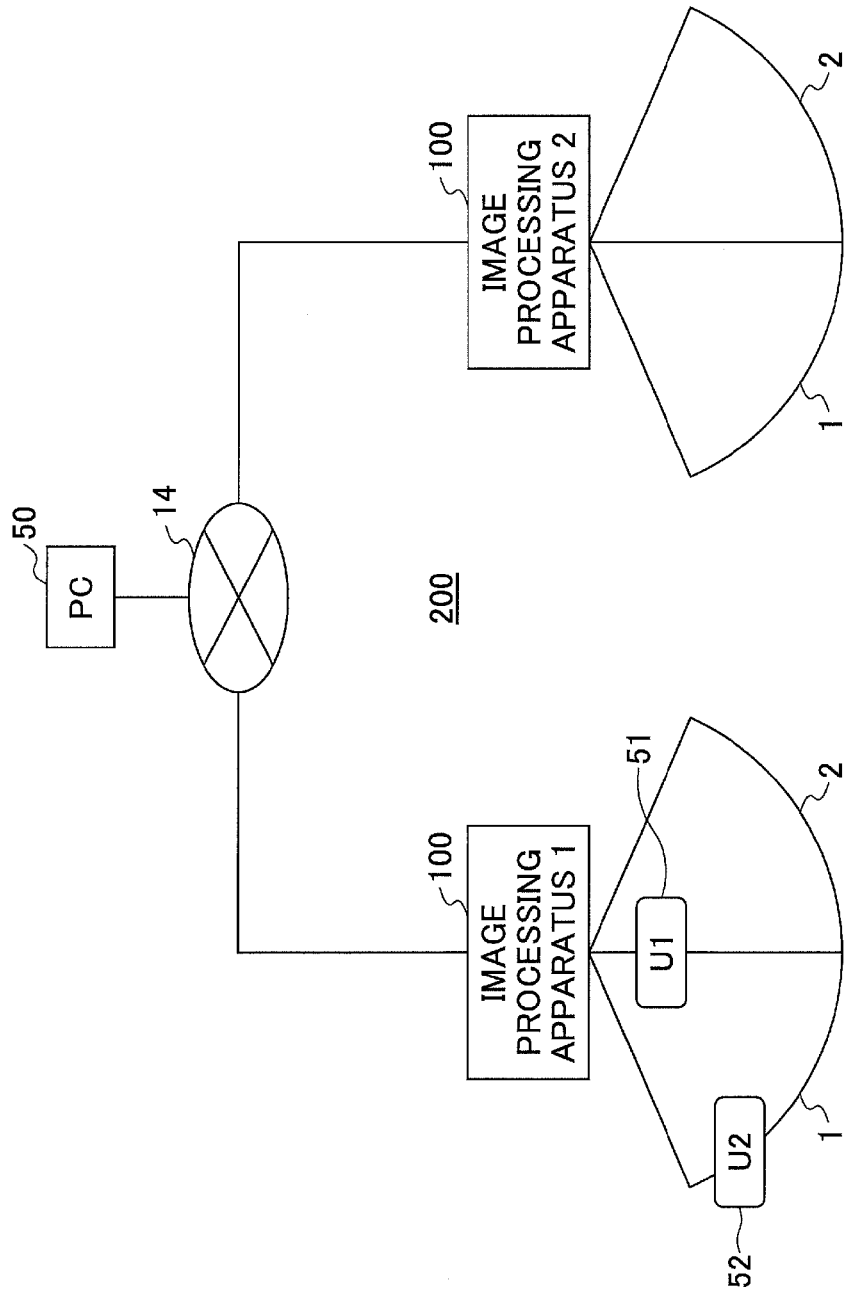
FIG. 10 is a configuration diagram illustrating an example of a communication system to which an image processing apparatus is coupled according to a second embodiment of the present invention.

FIG. 10 is a configuration diagram illustrating an example of a communication system 200 to which the image processing apparatus according to the present embodiment is coupled. In the communication system 200, the two image processing apparatuses 1, 2 and a PC 50 are coupled via a network 14. As explained in the first embodiment, the image processing apparatus 1 can determine the second user 52 who goes into the detection areas 1, 2.

The PC 50 is an example of an information processing apparatus which a user operates, and can communicate with the image processing apparatus 1 to perform various settings for the image processing apparatus 1. The PC 50 may be a smartphone, a tablet type terminal, a PDA (Personal Digital Assistant), a wearable terminal or the like.

The network 14 is configured with a communication network including mainly a wired network such as the Internet, a WAN, a LAN or the like and a communication network including mainly a wireless network such as a mobile telephone network, a wireless LAN or the like. The network 14 may include only a wired network or only a wireless network. Moreover, the above-described apparatuses may be coupled via a dedicated line, not the network 14.

In a case where the image processing apparatus 1 detects the second user 52, since the first user uses the image processing apparatus 1, the second user 52 is likely to use the image processing apparatus 2. Then, the image processing apparatus 1 causes the image processing apparatus 2 to return from the energy-saving mode via the network 14 before the image processing apparatus 2 detects the second user 52. Therefore, a wait time period from the second user's arrival at the image processing apparatus 2 can be reduced.

Meanwhile, although the image processing apparatus 2 also includes the human body detection sensor 25 in FIG. 10, the image processing apparatus 2 may not include the human body detection sensor 25.

Figure 11:
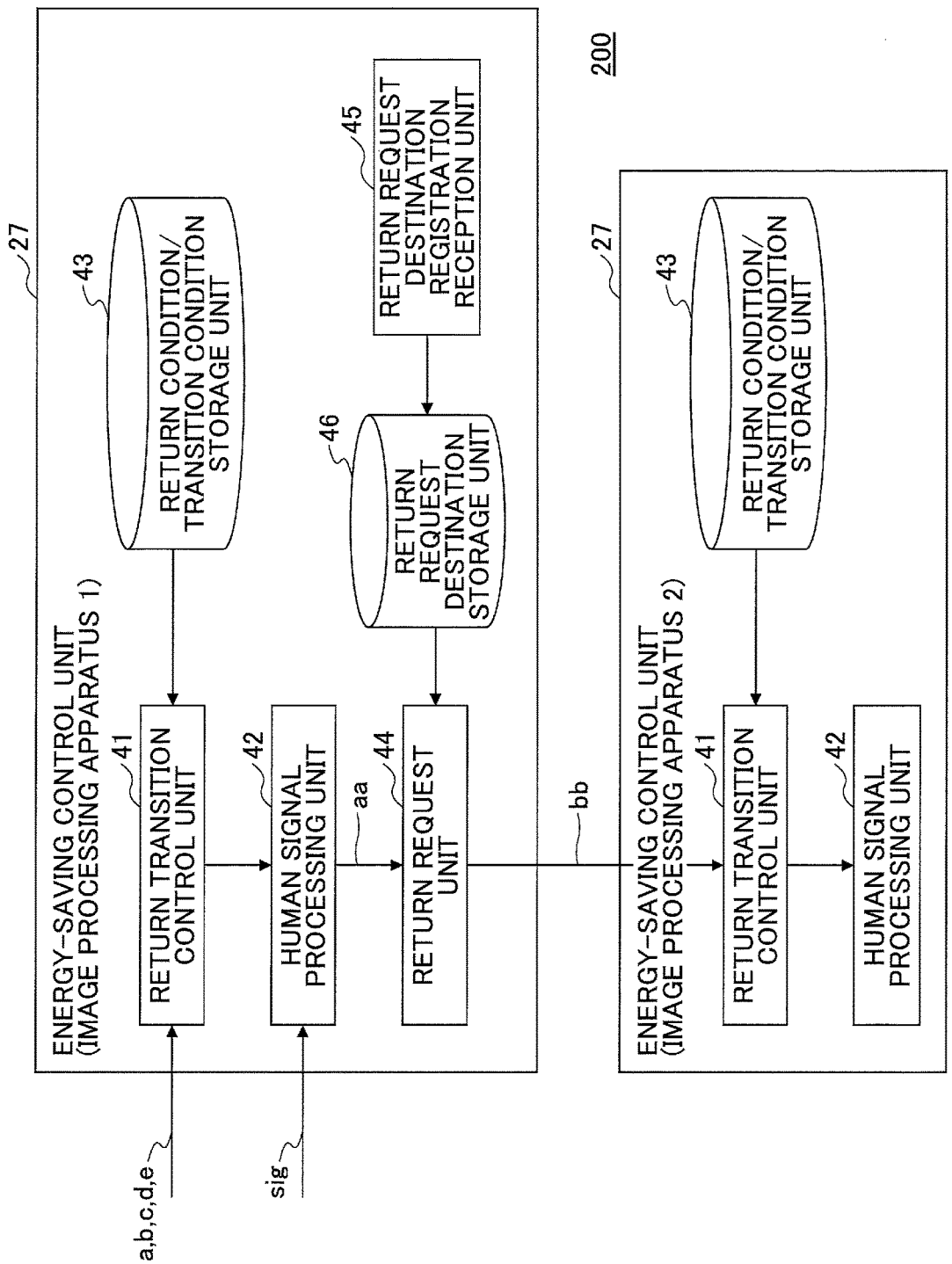
FIG. 11 is a functional block diagram illustrating an example of an image processing apparatus which the communication system includes according to the second embodiment of the present invention.

FIG. 11 is a functional block diagram illustrating an example of the image processing apparatuses 1, 2 which the communication system 200 includes. In the present embodiment, since a component to which the same reference numeral is assigned in FIG. 4 serves the same function, only a main component of the present embodiment may be explained mainly. The image processing apparatus 1 includes a return request destination registration reception unit 45 and a return request unit 44.

Moreover, the image processing apparatus 1 includes a return request destination storage unit 46 that stores return request destination information. The return request destination storage unit 46 is built, for example, in the ROM 203 or the RAM 202 of the energy-saving control unit 27.

The return request destination registration reception unit 45 receives from a user or the like registration of the image processing apparatus 2 to which the image processing apparatus 1 sends a return request "bb". For example, the return request destination registration reception unit 45 displays a list of other image processing apparatuses 100 coupled to the network 14 on an operation panel arranged along with the operation unit keys 24. Then, the return request destination registration reception unit 45 receives from the user a priority order of the other image processing apparatuses 100 to which the image processing apparatus 1 sends the return request "bb". The user can assign the highest priority order to the image processing apparatus 2 nearer to the image processing apparatus 1, for example.

Moreover, registration of the image processing apparatus 2, to which the image processing apparatus 1 sends the return request "bb", may be received from the PC 50 coupled to the network 14. In this case, the PC 50 activates a browser to communicate with the image processing apparatus 1, and displays on a display of the PC 50 the list of the other image processing apparatuses 100 coupled to the network 14. Then, an operator of the PC 50 can register the priority order of the other image processing apparatuses 100, to which the image processing apparatus 1 sends the return request "bb".

The list of the other image processing apparatuses 100 to which the priority order is assigned is stored in the return request destination storage unit 46 as the return request destination information.

TABLE 1

| Priority order | Image processing apparatus of transmission destination of return request |
|---|---|
| 1 | Image processing apparatus 2 |
| 2 | Image processing apparatus 3 |
| 3 | Image processing apparatus 4 |
| ... | ... |

Table 1 is a diagram illustrating an example of the return request destination information. In the return request destination information, the image processing apparatuses 100 of transmission destination of the return request "bb" are registered associated with the priority order. Then, the return request unit 44 can send the return request to an appropriate image processing apparatus 100.

Returning to FIG. 11, the return request unit 44 acquires from the human signal processing unit 42 second user detection information "aa" that the human signal processing unit 42 detects the second user 52. In a case of acquiring the second user detection information "aa", the return request unit 44 refers to the return request destination information to send the return request "bb" to the image processing apparatus 2. Then, the return transition control unit 41 of the image processing apparatus 2 can cause the image processing apparatus 2 to return from the energy-saving mode.

Figure 12:
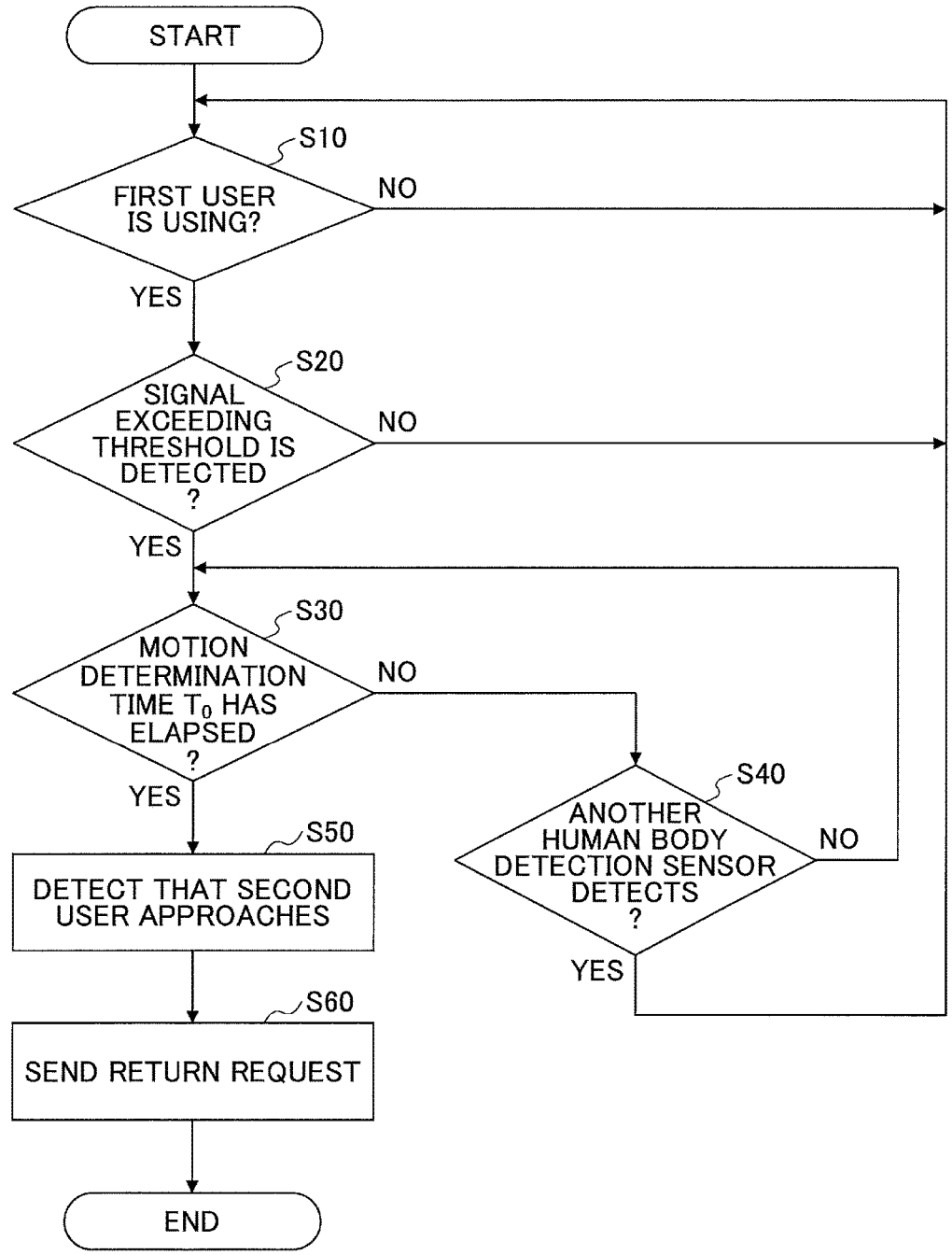
FIG. 12 is a flowchart illustrating an example of a procedure of a human signal processing unit for detecting a second user according to the second embodiment of the present invention.

FIG. 12 is a flowchart illustrating an example of a procedure of the human signal processing unit 42 for detecting the second user 52. Differences from FIG. 7 will be explained mainly.

According to processes at steps S10 to S50, the human signal processing unit 42 detects an approach of the second user 52. Then, the return request unit 44 sends the return request "bb" to the image processing apparatus 2 with the highest priority order (step S60).

Meanwhile, the return request unit 44 preferably determines whether the image processing apparatus 2 is already in use, and causes another image processing apparatus 100 to return from the energy-saving mode in a case of in use.

Figure 13:
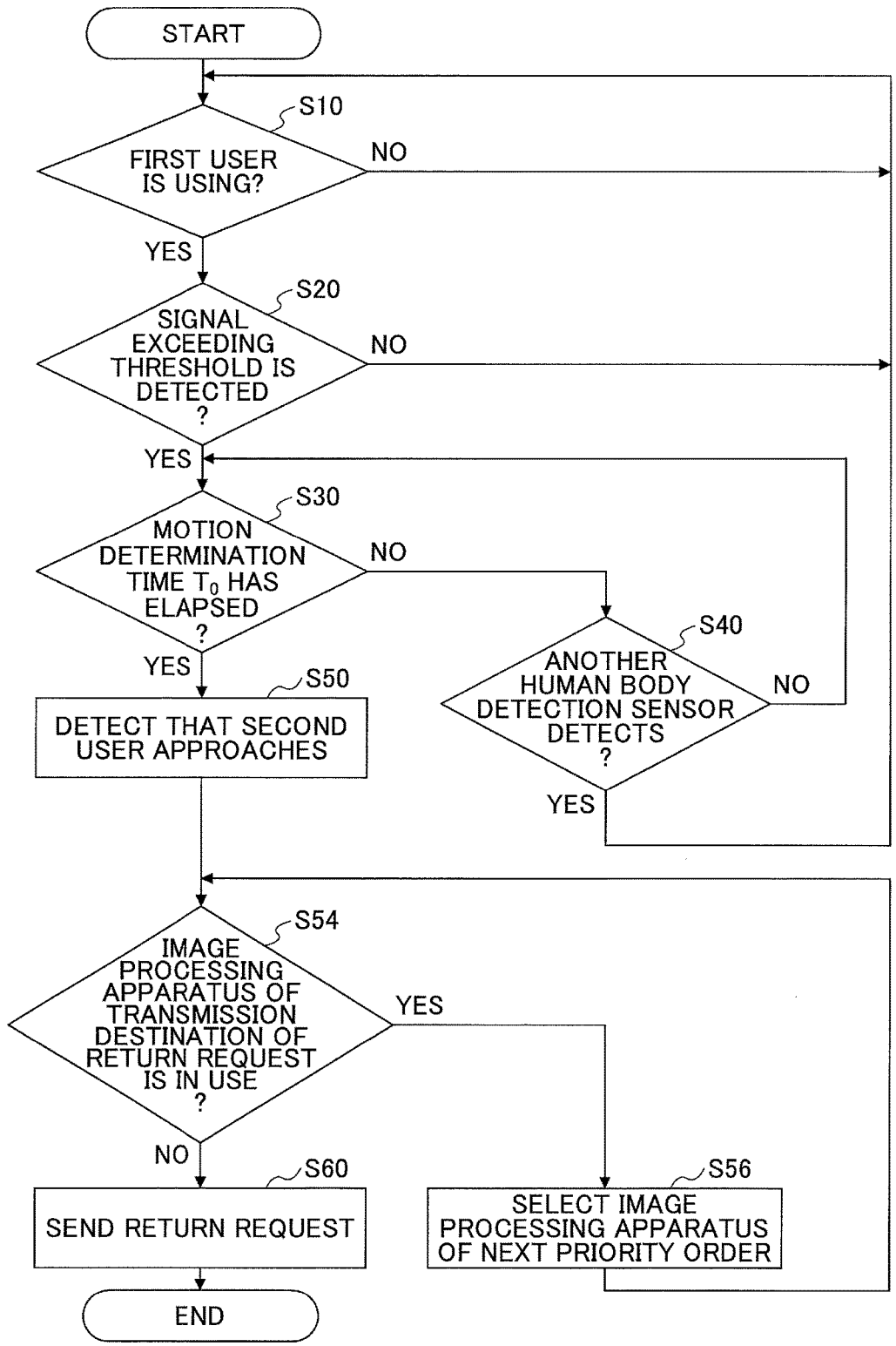
FIG. 13 is a flowchart illustrating another example of the procedure of the human signal processing unit for detecting the second user according to the second embodiment of the present invention.

FIG. 13 is a flowchart illustrating an example of the procedure of the human signal processing unit 42 for causing the other image processing apparatus 100 which is not in use to return from the energy-saving mode, in a case where the human signal processing unit 42 detects the second user 52.

In a case where at step S50 the human signal processing unit 42 detects an approach of the second user 52, the return request unit 44 determines whether the image processing apparatus 100 which is a transmission destination of the return request is in use (step S54). It is possible to determine whether the image processing apparatus 100 is in use by querying the image processing apparatus 100 which is the transmission destination of the return request.

In a case of in use, an image processing apparatus with the next highest priority order is selected from the return request destination information (step S56). Then, the process returns to step S54.

That is, the return request unit 44 of the image processing apparatus 1 queries, according to the priority order, the other image processing apparatus 100 whether it is in use, and sends the return request to the other image processing apparatus 100, which is not in use. Moreover in this case, guidance for the image processing apparatus 100 to be caused to return from the energy-saving mode may be displayed on the operation unit of the image processing apparatus 1, or the like.

As explained above, the image processing apparatus 100 according to the present embodiment can cause the other image processing apparatus 100 to return from the energy-saving mode in a case of detecting the second user 52.

Third Embodiment

In the second embodiment, it is explained that the return request "bb" is sent according to the priority order of the image processing apparatus 100 which is the destination of the return request, stored in the return request destination storage unit 46. In the present embodiment, an image processing apparatus 100 which sends the return request "bb" to an image processing apparatus 100 nearer to a detection area where the second user 52 is detected will be explained.

Figure 14:
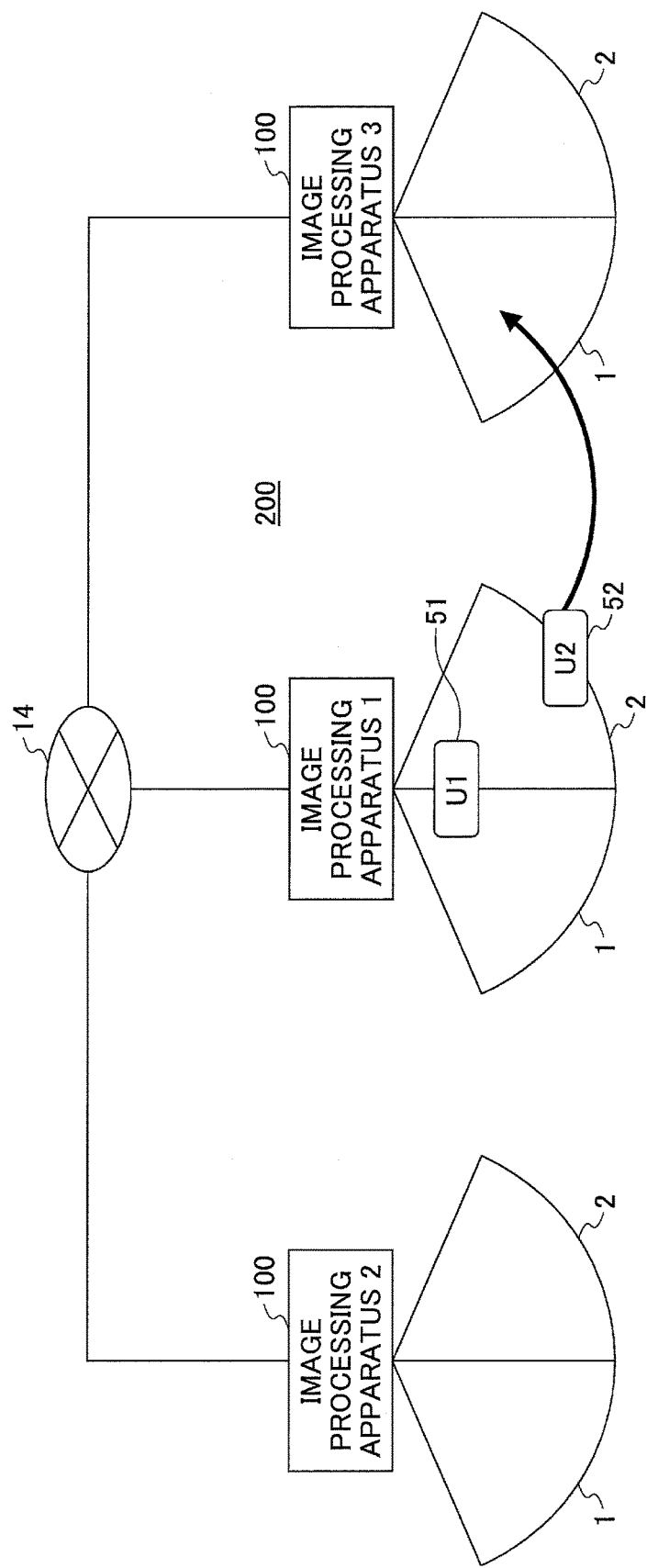
FIG. 14 is a configuration diagram illustrating an example of a communication system to which an image processing apparatus is coupled according to a third embodiment of the present invention.

FIG. 14 is a configuration diagram illustrating an example of a communication system 200 to which the image processing apparatus 100 according to a third embodiment is coupled. In the communication system shown in FIG. 14, three image processing apparatuses 1 to 3 are coupled to each other via the network 14. In a case where the image processing apparatus 1 detects the second user 52 in the detection area 2, the second user 52 is likely to use the image processing apparatus 3 nearer to the detection area 2. Then, the image processing apparatus 1 according to the present embodiment causes the other image processing apparatus 3 on a side nearer to the detection area 2 to return from the energy-saving mode. Then, the image processing apparatus 100 which the second user 52 is likely to use can be returned from the energy-saving mode, and wasteful returning from the energy-saving mode can be prevented.

Figure 15:
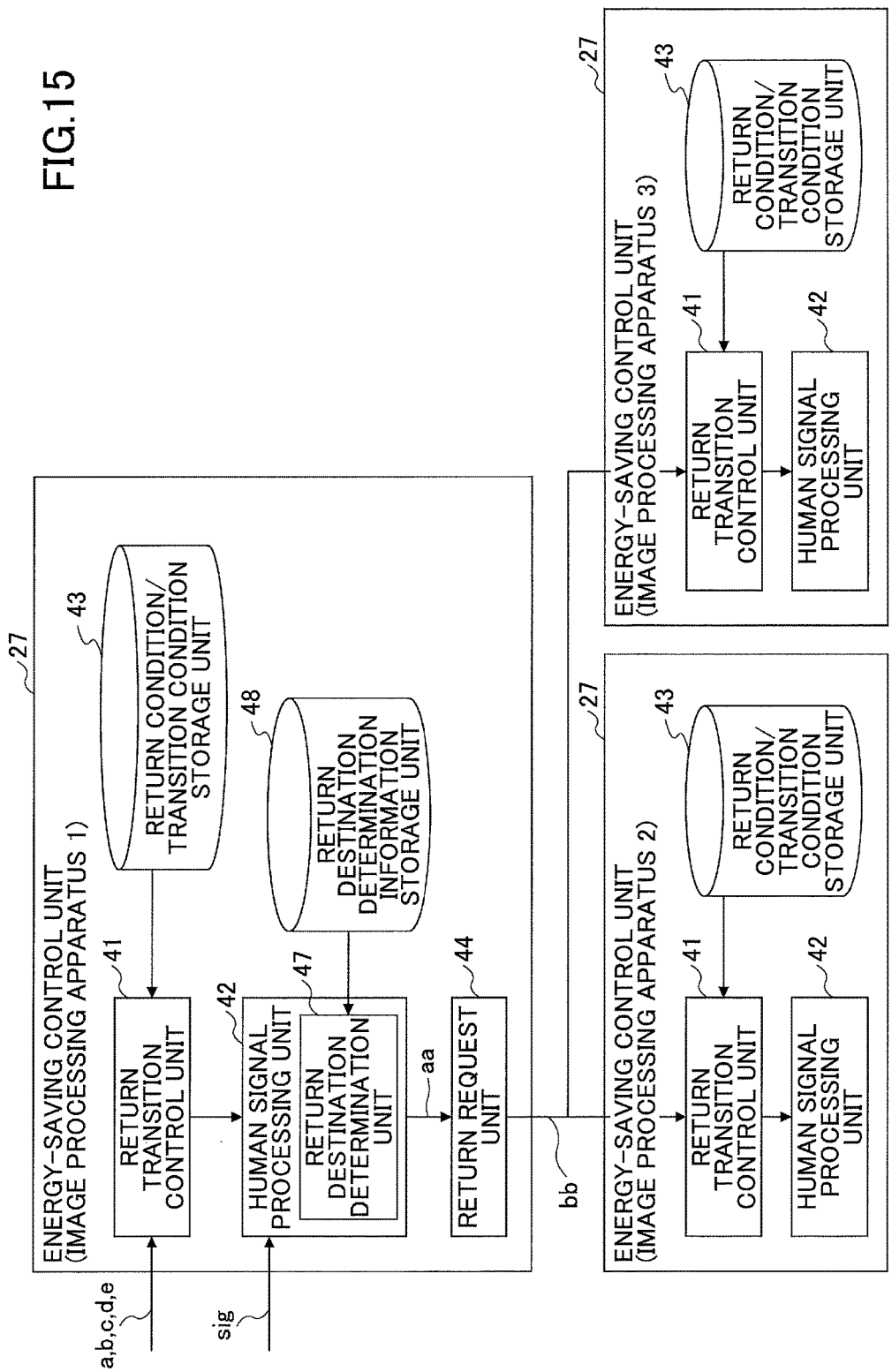
FIG. 15 is a functional block diagram illustrating an example of an image processing apparatus which the communication system includes according to the third embodiment of the present invention.

FIG. 15 is a functional block diagram illustrating an example of the image processing apparatuses which the communication system 200 includes. In the present embodiment, since a component to which the same reference numeral is assigned in FIG. 11 serves the same function, only a main component of the present embodiment may be explained mainly.

The image processing apparatus 1 includes, for example, a return destination determination information storage unit 48 which is built in the ROM 203 or the RAM 202. The return destination determination information storage unit 48 stores return destination determination information in which an image processing apparatus 100 of a transmission destination of the return request "bb" is registered. The return destination determination information also can be set by the user from the operation panel or the PC 50.

TABLE 2

| Detection area | Image processing apparatus of transmission destination of return request |
|---|---|
| Detection area 1 | Image processing apparatus 2 |
| Detection area 2 | Image professing apparatus 3 |
| From detection area 2 to detection area 1 | Image processing apparatus 2 |
| From detection area 1 to detection area 2 | Image processing apparatus 3 |

Table 2 is a diagram illustrating an example of the return destination determination information. In the return destination determination information, an image processing apparatus 100 of a transmission destination of the return request is registered associated with the detection area. As explained with reference to FIG. 14, the other image processing apparatus 100 on the side nearer to the detection area is registered.

Moreover, in a case where the second user 52 moves from the detection area 1 to the detection area 2 or from the detection area 2 to the detection area 1, a direction of movement of the user becomes clear. That is, according to an order of the user going into the detection areas 1, 2, the direction of movement of the user becomes clear. Then, in the return destination determination information, the image processing apparatus 100 of the transmission destination of the return request is registered for the order of the user going into the detection areas 1, 2.

For example, in a case where after the detection area 1 of the image processing apparatus 1, the second user 52 is detected in the detection area 2, the image processing apparatus 3 is a transmission destination of the return request. In a case where after the detection area 2 of the image processing apparatus 1, the second user 52 is detected in the detection area 1, the image processing apparatus 2 is a transmission destination of the return request. In this way, the direction of movement of the second user 52 is estimated, and thereby the other image processing apparatus 2 or 3 returns from the energy-saving mode.

Figure 16:
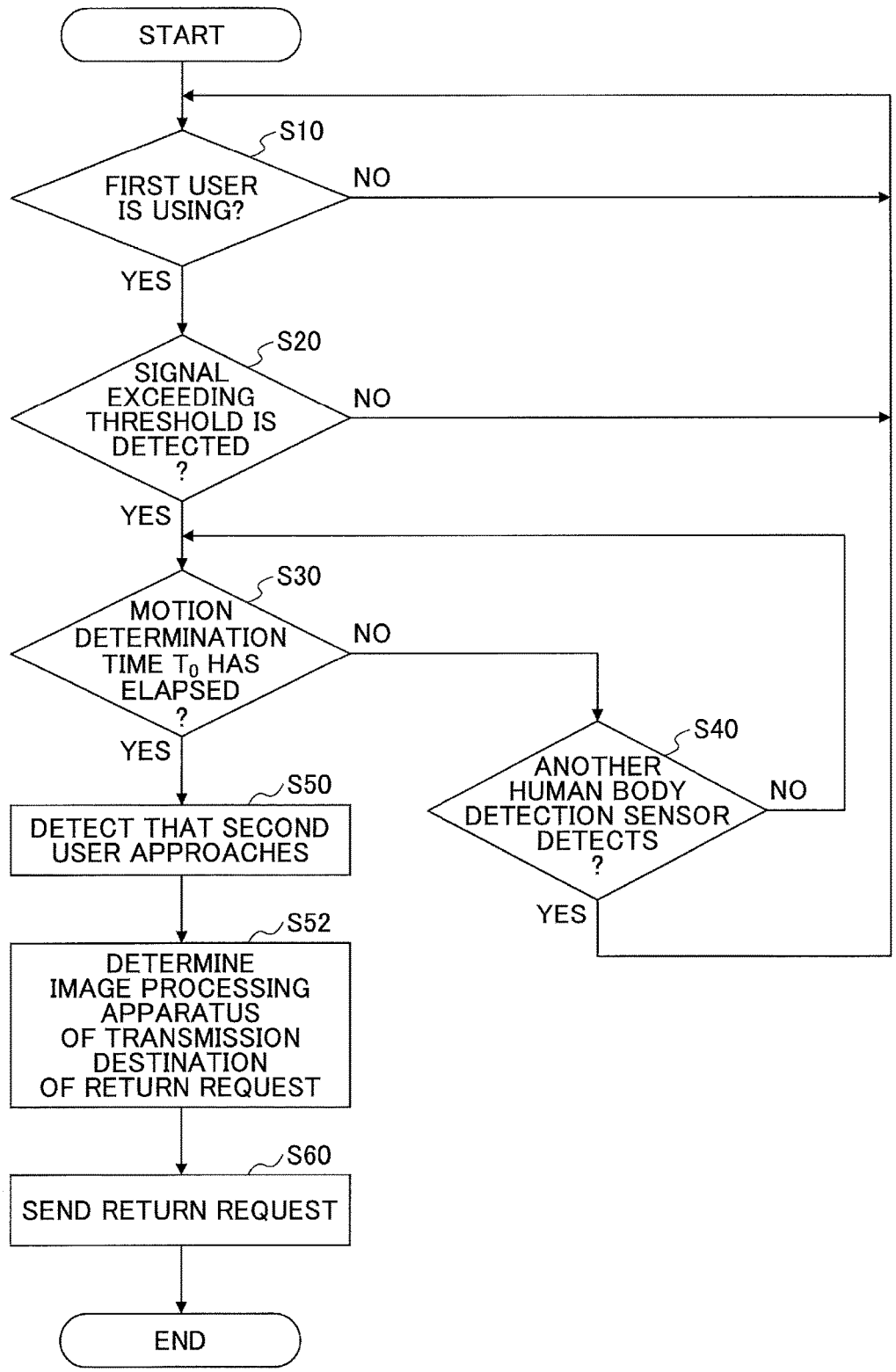
FIG. 16 is a flowchart illustrating an example of a procedure of a human signal processing unit for detecting a second user according to the third embodiment of the present invention.

FIG. 16 is a flowchart illustrating an example of a procedure of the human signal processing unit 42 for detecting the second user 52. Differences from FIG. 13 will be explained mainly.

According to processes at steps S10 to S50, the human signal processing unit 42 detects an approach of the second user 52.

Next, a return destination determination unit 47 determines an image processing apparatus 100 of a transmission destination of the return request (step S52). That is, based on which of the human body detection sensors 1, 2 detects or based on an order of detection, the return destination determination unit 47 refers to the return destination determination information to determine the image processing apparatus 100 of the transmission destination of the return request.

Then, the return request unit 44 sends the return request "bb" to the determined image processing apparatus 2 or 3 (step S60). Also in the present embodiment, an image processing apparatus 100 which is not in use is preferably selected.

As explained above, the image processing apparatus 100 according to the present embodiment estimates a direction of movement of the second user 52, and thereby causes an appropriate image processing apparatus 100 to return from the energy-saving mode.

Fourth Embodiment

In the present embodiment, a method for determining whether the first user 51 is using an image processing apparatus, which is different from the method explained in the first embodiment, will be explained.

Figure 17:
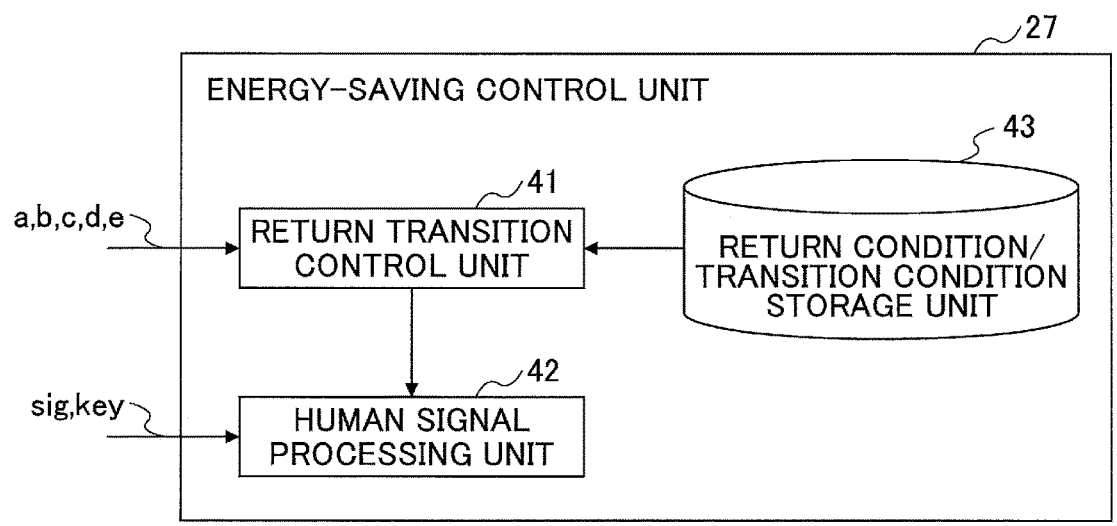
FIG. 17 is a functional block diagram illustrating an example of an energy-saving control unit according to a fourth embodiment of the present invention.

FIG. 17 is a functional block diagram illustrating an example of an energy-saving control unit 27. The functional block diagram is different from that of FIG. 4 in that an operation signal "key" for operation keys is input into a human signal processing unit 42. The human signal processing unit 42 according to the present embodiment monitors the operation signal "key" and determines that the image processing apparatus 1 is in use by the first user 51 in a case where a time period during which the operation keys are not operated is less than a certain period. This is because the user is considered to operate the operation keys continuously (without leaving non-operation time period) in order to use the image processing apparatus 1. Meanwhile, instead of the operation keys, an open/close operation of an ADF or an open/close operation of a cover of a contact glass for scanning a manuscript may be detected.

According to the above-described determination method, it is not necessary to specifically arrange a sensor to determine whether the image processing apparatus is in use by the first user 51, and an increase in cost can be suppressed.

On the other hand, with the above-described determination method, the image processing apparatus 100 could not immediately detect the first user 51 separating from the image processing apparatus 100 after using the image processing apparatus 100. Moreover, in a case where the first user 51 upon separating from the image processing apparatus 1 passes through the detection areas 1, 2, the image processing apparatus could detect erroneously that the second user 52 approaches.

Then, in order to detect that the first user 51 is using an information processing apparatus, it is also effective to arrange separately a sensor such as a reflective sensor for detecting that the user exists in the neighborhood.

Figure 18A:
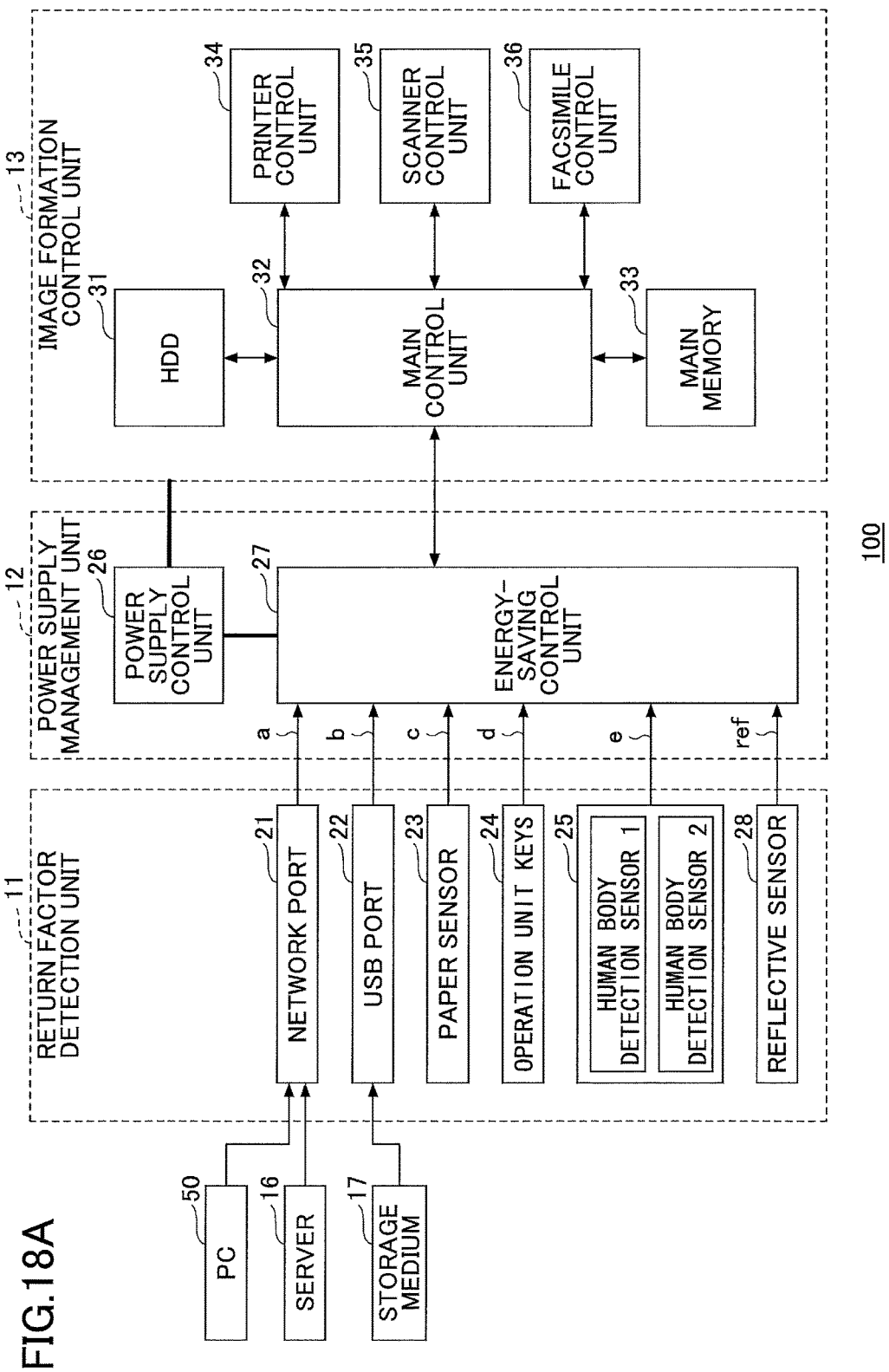
FIG. 18A is a configuration diagram illustrating an example of an image processing apparatus according to the fourth embodiment of the present invention.

FIG. 18A is a configuration diagram illustrating an example of the image processing apparatus. Since a component to which the same reference numeral is assigned in FIG. 2 serves the same function, only a main component of the present embodiment may be explained mainly. In FIG. 18A, a reflective sensor 28 is coupled to the energy-saving control unit 27. The reflective sensor 28 detects returned light, electric waves, sound waves or the like reflected on an object (the user) to detect the user's existence. Or, the reflective sensor 28 detects the user's existence by blocking (i.e. cannot detect) light, electric waves, sound waves or the like in a case where the user exists.

Figure 18B:
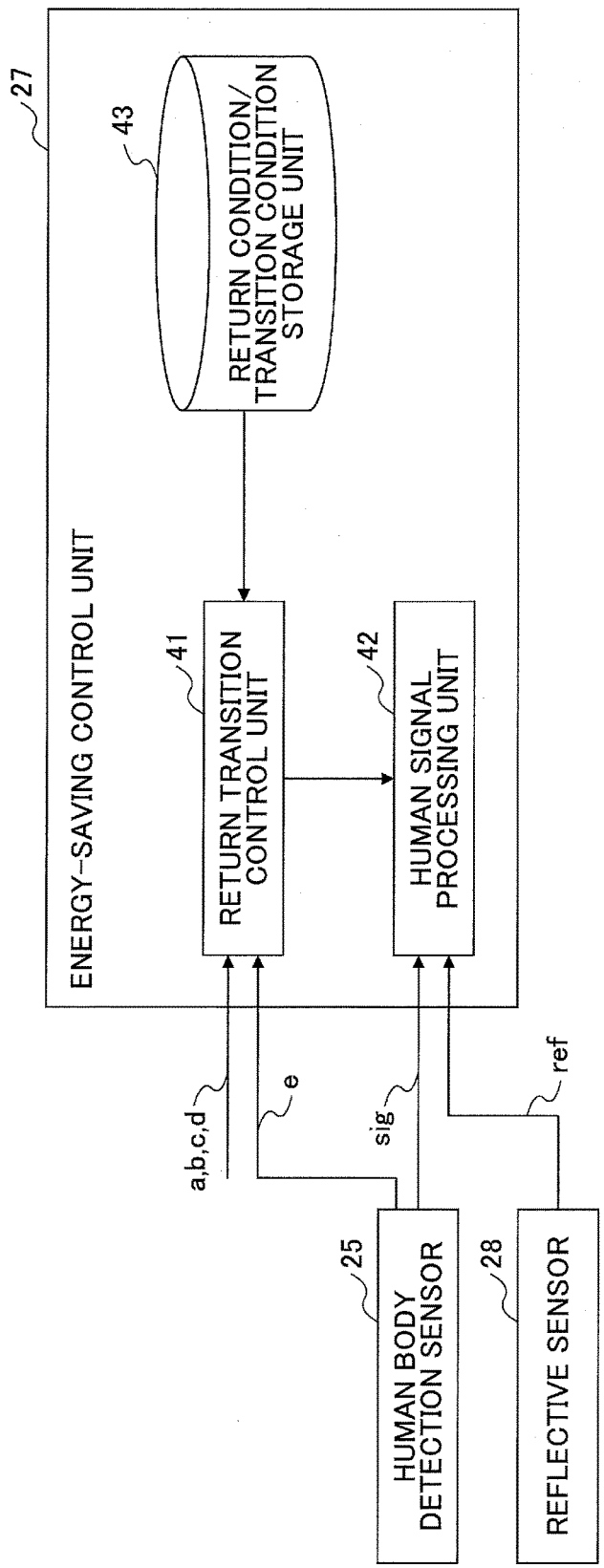
FIG. 18B is a functional block diagram illustrating an example of the image processing apparatus according to the fourth embodiment of the present invention.

FIG. 18B is a functional block diagram illustrating an example the energy-saving control unit 27 according to the present embodiment. To the human signal processing unit 42, in addition to the signal "sig" from the human body detection sensor, a user detection signal "ref" that the reflective sensor 28 detects is input.

The human signal processing unit 42 can detect that the first user 51 has separated from the image processing apparatus 100 in a case where the user detection signal "ref" becomes undetectable. Therefore, the erroneous detection that the second user 52 approaches in the case where the first user 51 passes through the detection areas 1, 2 upon separating can be suppressed.

Figure 19:
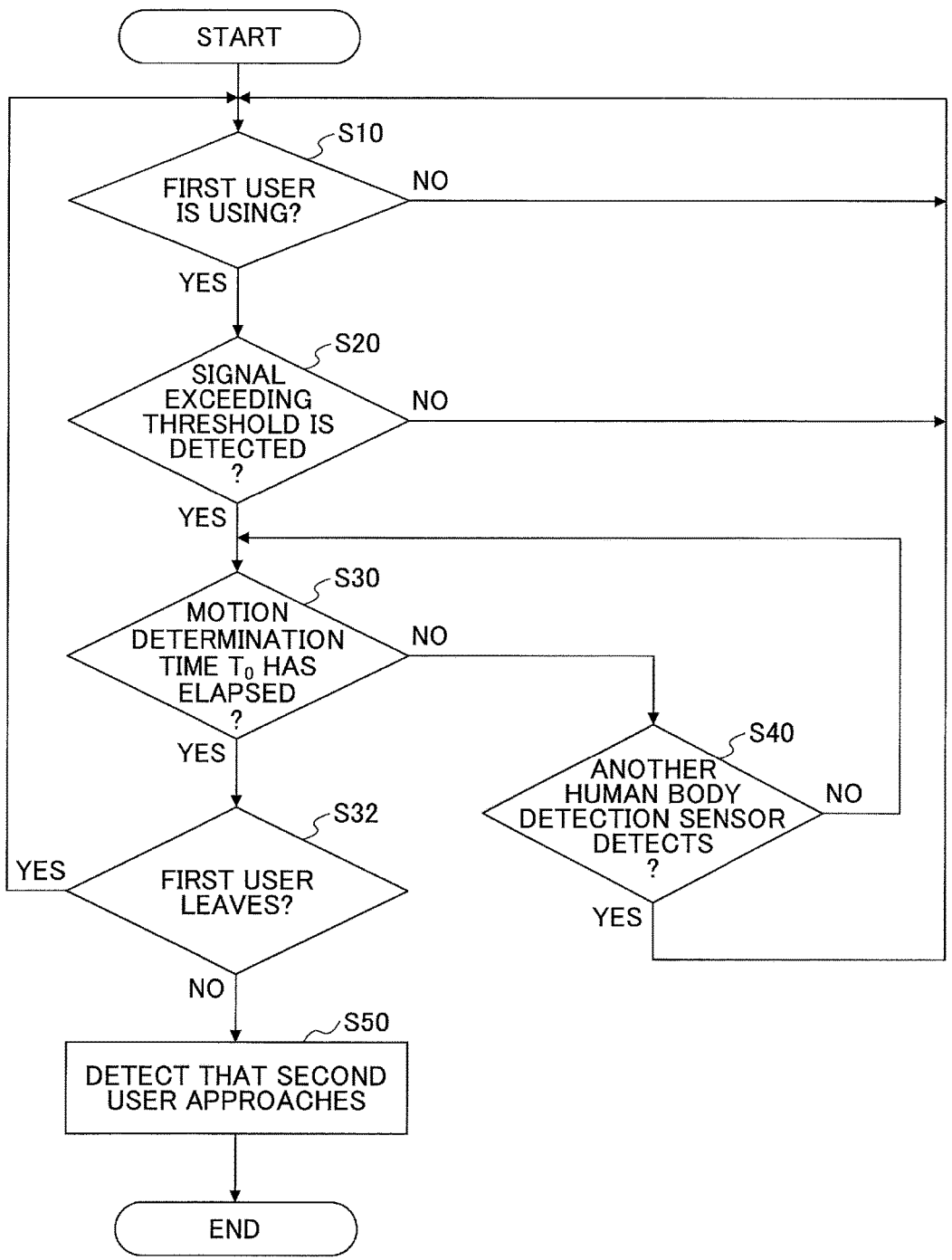
FIG. 19 is a flowchart illustrating an example of a procedure of a human signal processing unit for detecting a second user according to the fourth embodiment of the present invention.

FIG. 19 is a flowchart illustrating an example of a procedure of the human signal processing unit 42 for detecting the second user 52. Differences from FIG. 7 will be explained mainly.

In a case where at step S30 the motion determination time period $T_0$ has elapsed (step S30: YES), the human signal processing unit 42 determines whether the first user 51 has separated from the image processing apparatus 100 (step S32). That is, it is determined whether a user detection signal "ref" is not detected by the reflective sensor 28.

Then, in a case where the determination at step S32 is YES, since the second user 52 does not approach the image processing apparatus 100, the determination of detecting the second user is suspended and the process returns to step S10.

In a case where the determination at step S32 is NO, the human signal processing unit 42 determines that the second user 52 is detected (step S50).

Therefore, according to the present embodiment, the reflective sensor 28 or the like is used, and thereby accuracy of determination whether the second user 52 approaches can be enhanced.

Fifth Embodiment

In the fourth embodiment, the reflective sensor 28 is used to enhance the accuracy of determination whether the second user 52 approaches. In the present embodiment, an image processing apparatus in which the determination accuracy is enhanced by processing a signal "sig" will be explained. Meanwhile, for the function block diagram FIG. 4 in the first embodiment will be used.

Figure 20:
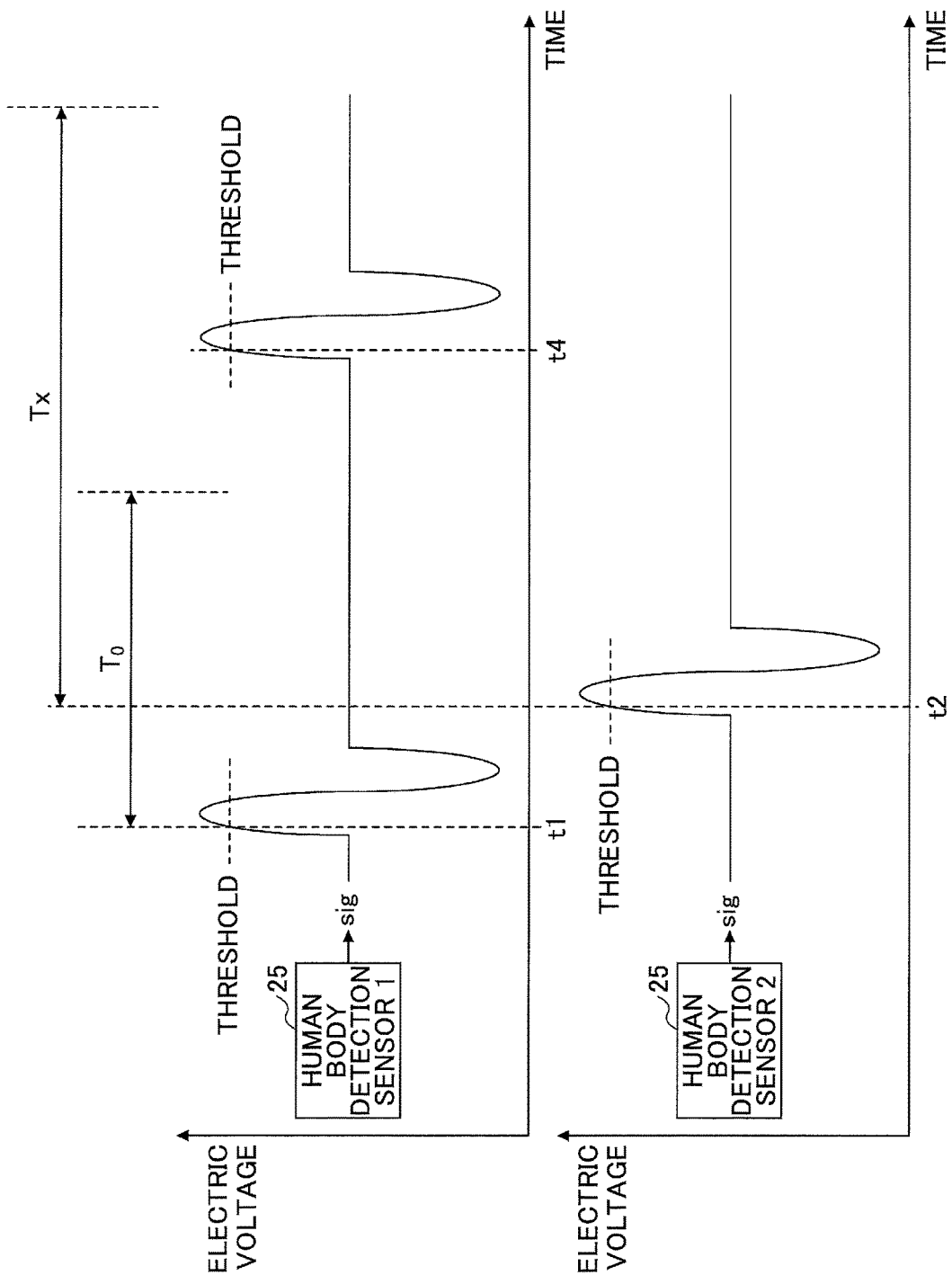
FIG. 20 is a diagram for schematically explaining a signal "sig" that a human signal processing unit detects according to a fifth embodiment of the present invention.

FIG. 20 is a diagram for schematically explaining the signal "sig" that the human signal processing units 1, 2 detect. At time t1, the human signal processing unit 1 outputs the signal "sig" which is greater than or equal to the threshold, and at time t2 within the motion determination time period $T_0$, the human signal processing unit 2 outputs the signal "sig" which is greater than or equal to the threshold. In this case, as explained in the first embodiment, it is determined that the first user 51 has moved.

Next, a case where the first user 51 finishes using the image processing apparatus 100 and separates from the image processing apparatus will be considered. In this case, at time t4 after a time period which is longer than the motion determination time period $T_0$ elapsed, the human body detection sensor 1 could output a signal "sig" which is greater than or equal to the threshold. In a case where the human body detection sensor 1 outputs the signal "sig" which is greater than or equal to the threshold after the motion determination time period $T_0$ has elapsed from the detection of the user by the human body detection sensor 2, the human signal processing unit 42 erroneously detects that the second user 52 approaches.

Then, in the present embodiment, during a certain period from the time when one of the human body detection sensors 25 detects (In FIG. 20, the human body detection sensor 1 detects the signal. However, the human body detection sensor 2 may detect the signal.) that the first user 51 moves (from time t2 in FIG. 20), the human signal processing unit 42 does not determine that the second user approaches (suspends the determination of detecting the second user), even if the other human body detection sensor 25 outputs the signal "sig" which is greater than or equal to the threshold. The above-described certain period will be referred to as "second user detection function invalid period Tx". The second user detection function invalid period Tx is an example of a second certain period.

Therefore, even if the reflective sensor 28 is not used, the erroneous detection by the human signal processing unit 42 that the second user 52 approaches in the case where the first user 51 passes through the detection areas 1, 2 upon separating can be suppressed.

Figure 21:
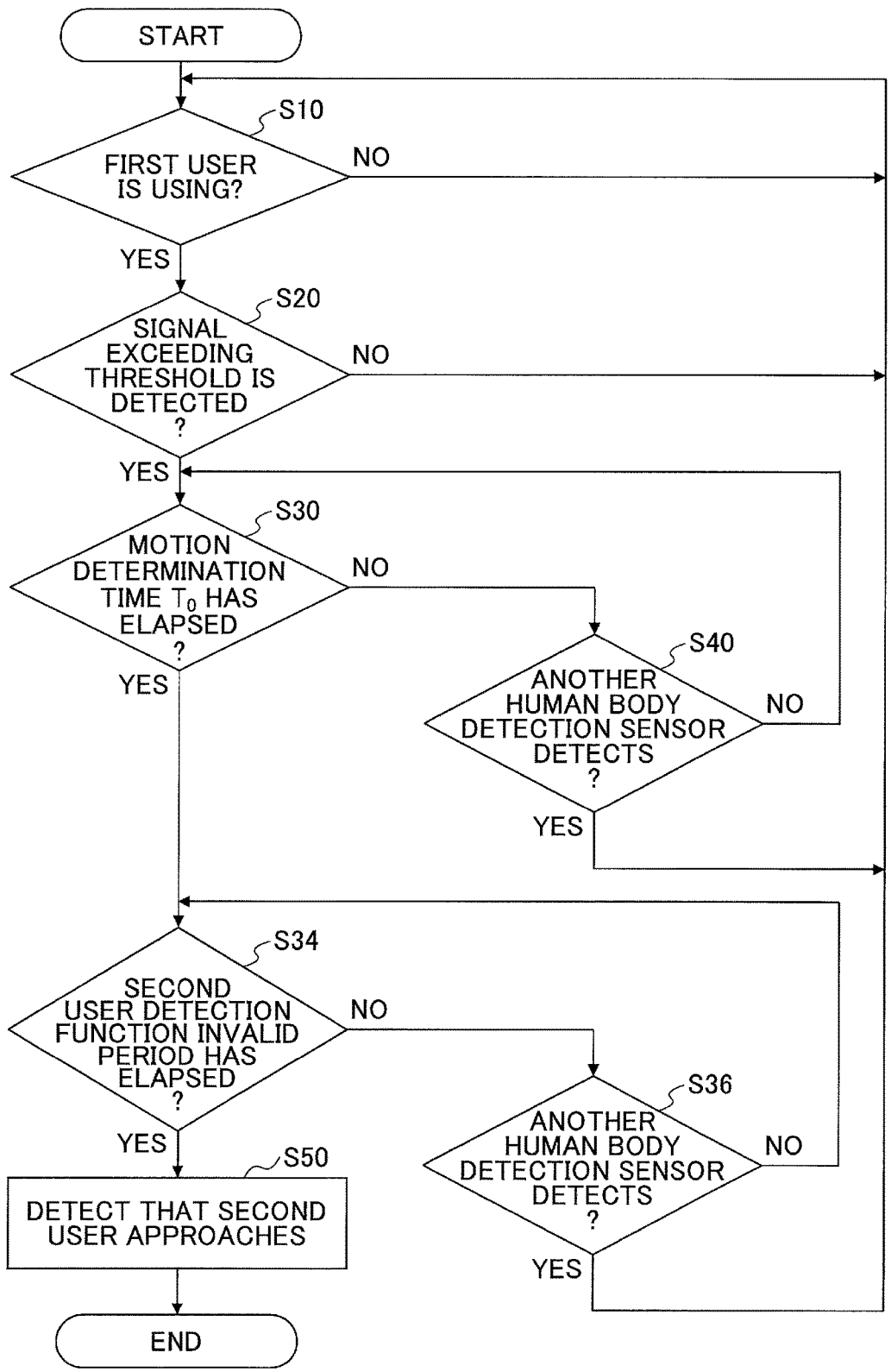
FIG. 21 is a flowchart illustrating an example of a procedure of a human signal processing unit for detecting a second user according to the fifth embodiment of the present invention.

FIG. 21 is a flowchart illustrating an example of a procedure of the human signal processing unit 42 for detecting the second user 52. Differences from FIG. 7 will be explained mainly.

In a case where at step S30 the motion determination time period $T_0$ has elapsed (step S30: YES), the human signal processing unit 42 determines whether the second user detection function invalid period Tx has elapsed (step S34).

In a case where the determination at step S34 is NO, the human signal processing unit 42 determines whether the other human body detection sensor 25 detects the signal "sig" which is greater than or equal to the threshold (step S36). In a case where the determination at step S36 is YES, it is determined that the first user 51 separates from the image processing apparatus 100, and the process returns to step S10.

In a case where the determination at step S36 is NO, the determination of detecting the second user is suspended and the process returns to step S34. Then, in a case where the determination at step S34 is YES, the human signal processing unit 42 determines that the second user 52 is detected (step S50).

Therefore, according to the image processing apparatus 100 of the present embodiment, the second user detection function invalid period is provided, and thereby accuracy of determination whether the second user 52 approaches can be enhanced.

<Variation>

Further, the present invention is not limited to these embodiments, but various variations and modifications may be made without departing from the scope of the present invention.

For example, in the present embodiment, the image processing apparatus 100 which detects the second user 52 is explained. The present embodiment can be applied to an apparatus such as a ticket-vending machine, an ATM (Automatic Teller Machine) or a projector.

Moreover, for example, the return condition/transition condition storage unit 43, the return request destination storage unit 46 and the return destination determination information storage unit 48 are explained to be components included in the energy-saving control unit 27. However, the above-described components may be provided in an apparatus coupled to the network 14.

According to the embodiment of the present invention, there is provided an information processing apparatus which can determine, in a case where a user approaches, whether the user is a first user or a second user.

What is claimed is:

1. An information processing apparatus for detecting a first user and a second user that approaches the information processing apparatus by using a plurality of detection devices including a first detection device and a second detection device which is different from the first detection device, the information processing apparatus comprising:

a second user determination unit configured to determine that a user detected by the first detection device is the second user, in a case where a certain time period has elapsed since the first detection device detects the user, at which the first user has been detected, the second detection device not detecting the user during the certain time period.

2. The information processing apparatus according to claim 1, wherein the second user determination unit is configured to determine that the user detected by the first detection device and the second detection device is the second user, in a case where the second detection device detects the user after the certain time period has elapsed since the first detection device detects the user.

3. The information processing apparatus according to claim 2,
wherein in a case where a separation detection device detects that the first user separates from the information processing apparatus, the second user determination unit does not determine that the user detected by the first detection device and the second detection device is the second user, in the case where the second detection device detects the user after the certain time period has elapsed since the first detection device detects the user.

4. The information processing apparatus according to claim 2,
wherein until a second certain time period has elapsed since the first detection device or the second detection device detects a motion of the first user, the second user determination unit does not determine that the user detected by the first detection device and the second detection device is the second user, in the case where the second detection device detects the user after the certain time period has elapsed since the first detection device detects the user.

5. The information processing apparatus according to claim 1,
wherein the second user determination unit is configured to determine that the user detected by the first detection device is the second user, in a case where the certain time period has elapsed since the first detection device detects the user, at which the first detection device and the second detection device have detected the first user, the second detection device not detecting the user during the certain time period.

6. The information processing apparatus according to claim 1, further comprising:
a return request transmission unit configured to send a return request to another information processing apparatus to cause the other information processing apparatus to return from an energy-saving mode, in a case where the second user determination unit determines that the user detected by the first detection device is the second user.

7. The information processing apparatus according to claim 6, further comprising:
a registration reception unit configured to receive a registration of a plurality of other information processing apparatuses, each of which is a transmission destination of the return request, with a priority order,
wherein the return request transmission unit is configured to query the other information processing apparatuses, in an order specified by the priority order, whether the respective other information processing apparatuses are in use, and to send the return request to an information processing apparatus which is not in use among the other information processing apparatuses.

8. The information processing apparatus according to claim 6, further comprising:
a return request transmission destination determination unit configured to determine an information processing apparatus among the other information processing apparatuses, to which the return request is to be sent according to the detection device that detects a user, referring to return destination determination information in which the other information processing apparatuses of the transmission destinations of the return request are registered associated with the detection device that detects the user or an order of the detection devices detecting the user, and to send the return request to the determined information processing apparatus.

9. The information processing apparatus according to claim 1,
wherein at least two of the detection devices are configured to detect one user simultaneously, and the each of the detection devices forms a detection area configured to exclusively detect one user.

10. A user detection method for detecting a first user and a second user that approaches an information processing apparatus by using a plurality of detection devices including a first detection device and a second detection device, which is different from the first detection device, the user detection method comprising:
determining by a second user determination unit that a user detected by the first detection device is the second user, in a case where a certain time period has elapsed since the first detection device detects the user, at which the first user has been detected, the second detection device not detecting the user during the certain time period.

11. The user detection method according to claim 10, further comprising:
determining by the second user determination unit that the user detected by the first detection device and the second detection device is the second user, in a case of detecting by the second detection device the user after the certain time period has elapsed since the first detection device detects the user.

12. The user detection method according to claim 11, further comprising:
suspending, in a case of detecting by a separation detection device that the first user separates from the information processing apparatus, the determination by the second user determination unit that the user detected by the first detection device and the second detection device is the second user, in the case of detecting by the second detection device the user after the certain time period has elapsed since the first detection device detects the user.

13. The user detection method according to claim 11, further comprising:
suspending, until a second certain time period has elapsed since the first detection device or the second detection device detects a motion of the first user, the determination by the second user determination unit that the user detected by the first detection device and the second detection device is the second user, in the case of detecting by the second detection device the user after the certain time period has elapsed since the first detection device detects the user.

14. The user detection method according to claim 10, further comprising:
determining by the second user determination unit that the user detected by the first detection device is the second user, in a case where the certain time period has elapsed since the first detection device detects the user, at which the first detection device and the second detection device have detected the first user, the second detection device not detecting the user during the certain time period.

15. The user detection method according to claim 10, further comprising:
sending by a return request transmission unit a return request to another information processing apparatus to cause the other information processing apparatus to return from an energy-saving mode, in a case of determining by the second user determination unit that the user detected by the first detection device is the second user.

16. The user detection method according to claim 15, further comprising:
   receiving by a registration reception unit a registration of a plurality of other information processing apparatuses, each of which is a transmission destination of the return request, with a priority order;
   querying by the return request transmission unit the other information processing apparatuses, in an order specified by the priority order, whether the respective other information processing apparatuses are in use; and
   sending the return request to an information processing apparatus which is not in use among the other information processing apparatuses.

17. The user detection method according to claim 15, further comprising:
   determining by a return request transmission destination determination unit an information processing apparatus among the other information processing apparatuses, to which the return request is sent according to the detection device that detects a user, referring to return destination determination information in which the other information processing apparatuses of the transmission destinations of the return request are registered associated with the detection device that detects the user or an order of the detection devices detecting the user; and
   sending the return request to the determined information processing apparatus.

18. The user detection method according to claim 10, wherein at least two of the detection devices are configured to detect one user simultaneously, and the each of the detection devices forms a detection area configured to exclusively detect one user.

19. A non-transitory computer readable medium including computer readable program segments when executed in an information processing apparatus causes the information processing apparatus to perform operations for detecting a first user and a second user that approaches the information processing apparatus by using a plurality of detection devices including a first detection device and a second detection device, which is different from the first detection device, the operations including,
   determining by a second user determination unit that a user detected by the first detection device is the second user, in a case where a certain time period has elapsed since the first detection device detects the user, at which the first user has been detected, the second detection device not detecting the user during the certain time period.

* * * * *